(12) United States Patent
Power, III

(10) Patent No.: US 12,341,408 B2
(45) Date of Patent: Jun. 24, 2025

(54) HYDROELECTRIC ENERGY SYSTEMS AND METHODS OF MANUFACTURING THE SAME

(71) Applicant: OCEANA ENERGY COMPANY, Washington, DC (US)

(72) Inventor: Daniel E. Power, III, Pace, FL (US)

(73) Assignee: OCEANA ENERGY COMPANY, Washington, DC (US)

( * ) Notice: Subject to any disclaimer, the term of this patent is extended or adjusted under 35 U.S.C. 154(b) by 0 days.

(21) Appl. No.: 18/687,380

(22) PCT Filed: Aug. 29, 2022

(86) PCT No.: PCT/US2022/041895
§ 371 (c)(1),
(2) Date: Feb. 28, 2024

(87) PCT Pub. No.: WO2023/034213
PCT Pub. Date: Mar. 9, 2023

(65) Prior Publication Data
US 2024/0356409 A1 Oct. 24, 2024

Related U.S. Application Data

(60) Provisional application No. 63/238,538, filed on Aug. 30, 2021.

(51) Int. Cl.
*H02K 7/18* (2006.01)
*C25B 1/04* (2021.01)
(Continued)

(52) U.S. Cl.
CPC ............. *H02K 7/1823* (2013.01); *C25B 1/04* (2013.01); *C25B 9/65* (2021.01); *C25B 15/08* (2013.01);
(Continued)

(58) Field of Classification Search
CPC ........ H02K 7/1823; H02K 7/08; H02K 15/00; B63B 2035/4466; F05B 2240/51;
(Continued)

(56) References Cited

U.S. PATENT DOCUMENTS

| 4,720,640 A | * | 1/1988 | Anderson | F03D 13/20 |
| | | | | 290/43 |
| 7,425,772 B2 | * | 9/2008 | Novo Vidal | H02K 7/183 |
| | | | | 290/55 |

(Continued)

FOREIGN PATENT DOCUMENTS

| CA | 2674092 A1 | * | 7/2008 | ............ F03B 13/264 |
| CA | 2778113 C | * | 4/2018 | .............. F03B 13/10 |

(Continued)

OTHER PUBLICATIONS

International Search Report and Written Opinion issued in Application No. PCT/US2022/041895, dated Dec. 16, 2022.

*Primary Examiner* — Pedro J Cuevas
(74) *Attorney, Agent, or Firm* — Jones Robb, PLLC

(57) ABSTRACT

A hydroelectric energy system in accordance with the present disclosure includes a stationary ring structure including a stationary ring foundation and a stationary ring backing. The system also includes a rotating ring structure including a rotating ring foundation and a blade support ring disposed radially outward of the rotating ring foundation. The rotating ring foundation is disposed radially outward of the stationary ring foundation and is configured to rotate around the stationary ring foundation about an axis of rotation. The system further includes at least one bearing mechanism configured to support the rotating ring structure relative to the stationary ring structure during rotation of the rotating ring foundation around the stationary ring foundation. During the rotation, the stationary ring backing is configured to be in compression and to support the stationary ring foun- (Continued)

dation, the rotating ring foundation, and the blade support ring in a stacked configuration within a fluid current.

27 Claims, 33 Drawing Sheets

(51) Int. Cl.
    *C25B 9/65*     (2021.01)
    *C25B 15/08*     (2006.01)
    *F25J 1/00*     (2006.01)
    *H02K 7/08*     (2006.01)
    *H02K 15/00*     (2025.01)

(52) U.S. Cl.
    CPC .............. *F25J 1/001* (2013.01); *H02K 7/08* (2013.01); *H02K 15/00* (2013.01)

(58) Field of Classification Search
    CPC ........ F05B 2240/93; F03B 17/06; F03B 3/12; F03B 11/06; Y02E 10/20; Y02E 10/30
    See application file for complete search history.

(56) References Cited

U.S. PATENT DOCUMENTS

| | | | | |
|---|---|---|---|---|
| 8,310,077 | B2* | 11/2012 | Pearce | F03B 13/264 |
| | | | | 290/54 |
| 10,337,486 | B2* | 7/2019 | White | H02K 7/1823 |
| 10,389,209 | B2* | 8/2019 | Power | H02K 7/14 |
| 10,544,775 | B2* | 1/2020 | Power, III | F03B 11/06 |
| 11,384,726 | B2* | 7/2022 | Power, III | F03B 3/16 |
| 2003/0137149 | A1* | 7/2003 | Northrup | H02K 7/183 |
| | | | | 290/44 |
| 2007/0278796 | A1* | 12/2007 | Power | F03D 5/04 |
| | | | | 290/43 |
| 2008/0088135 | A1* | 4/2008 | Novo Vidal | H02K 7/1823 |
| | | | | 310/156.12 |
| 2009/0096216 | A1* | 4/2009 | Power, III | F03D 5/04 |
| | | | | 290/54 |
| 2010/0007148 | A1* | 1/2010 | Davis | F03B 17/061 |
| | | | | 290/54 |
| 2010/0026002 | A1* | 2/2010 | Spooner | H02K 11/05 |
| | | | | 290/54 |
| 2010/0133844 | A1* | 6/2010 | Pearce | F03B 13/264 |
| | | | | 415/110 |
| 2011/0110770 | A1* | 5/2011 | Spooner | F16C 32/0427 |
| | | | | 415/173.1 |
| 2014/0369841 | A1* | 12/2014 | Duchene | F01D 5/147 |
| | | | | 29/889.7 |
| 2017/0009807 | A1 | 1/2017 | Davey et al. | |
| 2017/0207680 | A1 | 7/2017 | Power et al. | |
| 2018/0045165 | A1 | 2/2018 | White et al. | |
| 2018/0298876 | A1* | 10/2018 | Power, III | F03B 9/00 |
| 2019/0326794 | A1* | 10/2019 | Power, III | F03B 11/06 |

FOREIGN PATENT DOCUMENTS

| | | | | |
|---|---|---|---|---|
| CA | 3178584 C | * | 6/2024 | ............ F16C 17/102 |
| FR | 2986576 A1 | * | 8/2013 | ............. F03B 11/06 |
| KR | 1020090104059 A | | 10/2009 | |
| WO | WO-03025385 A2 | * | 3/2003 | ............ F03B 13/083 |
| WO | WO-2008081187 A2 | * | 7/2008 | ............ F03B 13/264 |
| WO | WO-2011059708 A2 | * | 5/2011 | ............. F03B 13/10 |
| WO | WO-2013025726 A2 | * | 2/2013 | ............. F03B 11/06 |
| WO | WO-2015175535 A1 | * | 11/2015 | ........... F03B 17/061 |

* cited by examiner

HYDROELECTRIC ENERGY SYSTEMS AND METHODS OF MANUFACTURING THE SAME

CROSS-REFERENCE TO RELATED APPLICATIONS

This application is a National Stage application of International Patent Application No. PCT/US2022/041895, filed internationally on Aug. 29, 2022, which claims priority to U.S. Provisional Patent Application No. 63/238,538, filed Aug. 30, 2021, and entitled "Devices, Systems, and Methods for Hydrogen Generation, Collection, and Distribution," the entire content of each of which is incorporated by reference herein.

TECHNICAL FIELD

The present disclosure relates generally to hydroelectric energy systems and methods of manufacturing such systems using additive manufacturing, and more particularly to methods of manufacturing hydroelectric turbines using additive manufacturing processes.

INTRODUCTION

The section headings used herein are for organizational purposes only and are not to be construed as limiting the subject matter described in any way.

Utilizing renewable energy sources and decreasing the reliance on carbon-based energy production is of increasing interest throughout the world today. A variety of energy production technologies have been developed in an effort to reduce reliance on fossil fuels, including but not limited to, for example, electricity generation converted from fluid flow, such as wind or water currents. Such energy conversion systems often rely on a turbine in which blades interact with fluid currents (e.g., from wind or water) causing rotation of a rotor that spins a generator to produce electricity.

In a hydroelectric energy system, a hydroelectric turbine is used to generate electricity from the current in a moving body of water (e.g., a river or ocean current) or other fluid source. Tidal power, for example, exploits the movement of water caused by tidal currents, or the rise and fall in sea levels due to tides. As the waters rise and then fall, a flow, or fluid current, is generated. The one-directional flow, for example, from a river also creates a current that may be used to generate electricity.

Hydroelectric energy, which relies on the natural movement of currents in a body of liquid (e.g., water), is classified as a renewable energy source. Unlike other renewable energy sources, such as wind and solar energy, however, hydroelectric energy is reliably predictable. Water currents are a source of renewable power that is clean, reliable, and predictable years in advance, thereby facilitating integration with existing energy grids. Additionally, by virtue of the basic physical characteristics of water (including, e.g., seawater), namely, its density (which can be 832 times that of air) and its non-compressibility, this medium holds unique "ultra-high-energy-density" potential in comparison to other renewable energy sources for generating renewable energy. This potential is amplified once the volume and flow rates present in many coastal/river locations and/or useable locations worldwide are factored in.

Aside from the production of electricity for distribution to a power grid, renewable energy sources, including but not limited to, fluid flow energy conversion systems, can be used to produce hydrogen by using the electricity produced by those systems to power electrolysis equipment (electrolyzers). Because of its reliance on and co-location with large bodies of water, hydroelectric energy systems are particularly well-suited to the production of hydrogen using electrolysis. The hydrogen generated by the electrolysis process can, for example, be stored and used as a noncarbon based form of fuel.

Hydroelectric energy, therefore, may offer an efficient, long-term source of pollution-free electricity, hydrogen production, and/or other useful forms of energy that can help reduce the world's current reliance upon petroleum, natural gas, and coal. Reduced consumption of fossil fuel resources can in turn help to decrease the output of greenhouse gases into the world's atmosphere.

Electricity generation using hydroelectric turbines (which convert kinetic energy from fluid currents into rotational mechanical energy) is generally known. Hydroelectric energy systems, however, are generally relatively complex and require custom components and parts that can be costly to produce in the large scale required for such systems. Additional challenges also may arise with assembling such large and complex systems, which generally have multiple components that need to be fastened together, at an installation location.

It is desirable to provide a hydroelectric energy system that not only has a robust configuration, but also is efficient to produce and assemble. It also is desirable to provide a hydroelectric energy system having a design, which minimizes the number of parts requiring assembly, for example, at an installation location. It is further desirable to provide a hydroelectric energy system that allows for flexibility in design and is scalable to accommodate different applications.

SUMMARY

Exemplary embodiments of the present disclosure may demonstrate one or more of the above-mentioned desirable features. Other features and/or advantages may become apparent from the description that follows.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

In accordance with one aspect of the present disclosure, a hydroelectric energy system is provided. The hydroelectric energy system includes a stationary ring structure comprising a stationary ring foundation and a stationary ring backing disposed at least partially within an opening defined by the stationary ring foundation. The stationary ring foundation has a first plurality of electricity-generating elements. The hydroelectric energy system also includes a rotating ring structure comprising a rotating ring foundation and a blade support ring disposed radially outward of an outer circumferential surface of the rotating ring foundation. The rotating ring foundation has a second plurality of electricity-generating elements. The rotating ring foundation is disposed radially outward of an outer circumferential surface of the stationary ring foundation and is configured to rotate around the stationary ring foundation about an axis of rotation. The hydroelectric energy system further includes at least one bearing mechanism configured to support the rotating ring structure relative to the stationary ring structure during rotation of the rotating ring foundation around the stationary ring foundation. During the rotation of the rotating ring foundation around the stationary ring foundation, the stationary ring backing is configured to be in compression and to support the stationary ring foundation, the rotating ring foundation, and the blade support ring in a stacked configuration within a fluid current flowing in a direction substantially parallel to the axis of rotation.

In accordance with another aspect of the present disclosure, a method of manufacturing a hydroelectric energy system including a stationary ring structure and a rotating ring structure is provided. The method includes printing a foundation for the stationary ring structure. The stationary ring foundation has at least one slot within an outer circumferential surface of the stationary ring foundation. The at least one slot being configured to receive a first plurality of electricity-generating elements. The method additionally includes positioning a stationary ring mold over an inner circumferential surface of the stationary ring foundation to form an internal cavity between the stationary ring mold and the stationary ring foundation. The method also includes affixing a bearing material to the outer circumferential surface of the stationary ring foundation. The method further includes inserting a thin layer of an abradable material over the bearing material. During operation of the hydroelectric energy system, the abradable material is configured to wear away to form a bearing gap between the stationary ring structure and the rotating ring structure. The method also includes printing a foundation for the rotating ring structure over the abradable material. The rotating ring foundation has at least one slot configured to receive a second plurality of electricity-generating elements. The method additionally includes filling the internal cavity formed between the stationary ring mold and the stationary ring foundation with a core material. The core material is configured to harden to form a backing of the stationary ring structure. The method further includes printing a blade support ring comprising one or more blades. Each blade extending both radially inwardly of the blade support ring and radially outwardly of the blade support ring. The blade support ring is configured to couple with the rotating ring foundation to form the rotating ring structure.

In accordance with an additional aspect of the present disclosure, a method of manufacturing a stationary ring structure for a hydroelectric energy system is provided. The method includes printing a foundation for the stationary ring structure. The foundation has a circular shape with a U-shaped cross-section. The U-shaped cross-section comprises a base and first and second side walls extending substantially perpendicular to the base. The foundation has at least one slot configured to receive a plurality of electricity-generating elements. The method also includes affixing the plurality of electricity-generating elements within the at least one slot of the foundation. The method additionally includes overlaying the foundation with a mold, such that the mold adjoins the first and second side walls and the foundation and mold together define a sealed internal cavity. The method further includes filling the internal cavity with a core material. The core material being configured to harden to form a backing of the stationary ring structure.

In accordance with a further aspect of the present disclosure, a method of manufacturing a rotating ring structure for a hydroelectric energy system is provided. The method includes printing a foundation for the rotating ring structure. The foundation has a circular shape with a U-shaped cross-section and has at least one slot configured to receive a plurality of electricity-generating elements. The method also includes affixing the plurality of electricity-generating elements into the at least one slot of the foundation. The method further includes printing a blade support ring comprising one or more blades. Each blade extends both radially inwardly of the blade support ring and radially outwardly of the blade support ring. The blade support ring is configured to couple with the foundation to form the rotating ring structure.

It is to be understood that both the foregoing general description and the following detailed description are exemplary and explanatory only and are not restrictive of the present disclosure and claims, including equivalents. It should be understood the present disclosure and claims, in their broadest sense, could be practiced without having one or more features of these exemplary aspects and embodiments. For example, those of ordinary skill in the art would understand that the following detailed description related to hydroelectric energy systems and methods are exemplary only, and that the disclosed systems and methods can have various components, which utilize various hydroelectric turbines, mechanical energy transmission components, gear assemblies, and generators to collect, transmit, and convert mechanical energy into electrical energy.

BRIEF DESCRIPTION OF THE DRAWINGS

The accompanying drawings, which are incorporated in and constitute a part of this specification, illustrate various non-limiting embodiments of the present disclosure and together with the description, serve to explain certain principles. In the drawings.

DETAILED DESCRIPTION

The present disclosure solves one or more of the above-mentioned problems and/or achieves one or more of the above-mentioned desirable features. Other features and/or advantages may become apparent from the description which follows.

The present disclosure contemplates hydroelectric energy systems that include a hydroelectric turbine comprising a stationary ring structure and a rotating ring structure that is configured to rotate with respect to the stationary ring structure about an axis of rotation. Turbines in accordance with the present disclosure may, for example, have a plurality of blades having blade portions extending both radially inward and radially outward with respect to the rotating ring structure. In this manner, fluid flow having a directional component flow generally parallel to the axis of rotation of the rotating ring structure acts on the blade portions thereby causing the rotating ring structure to rotate about the axis of rotation (see fluid flow F and axis A in FIG. 1).

Hydroelectric energy systems of the present disclosure contemplate hydroelectric turbines having a straightforward design/architecture that differs from previous body-on-ring designs/architectures. Such body-on-ring architectures, for example, generally utilize a chassis ring (e.g., a stator) and a blade support ring (e.g., a rotor) as structural members, wherein the stresses placed on the turbine are passed through the rings, and the turbines are configured to collect energy from two directions (e.g., the turbines are configured to function in a two-directional flow, in which the flow may come from either (opposite) side of the turbine). In such architectures, various components are fastened to and rest on each of the two rings to form the complete assembled turbine. The present disclosure contemplates utilizing additive manufacturing (AM) methods to print each of the rings (the stationary ring structure and the rotating ring structure), thereby simplifying the turbine by incorporating parts that would normally be fastened to the rings into the rings themselves during the printing process. The contemplated systems and methods may therefore consolidate the parts of the turbine to greatly reduce the time, cost, and complexity of the turbine's assembly, while also increasing the strength and life expectancy of the turbine. Reliance on additive manufacturing methods to fabricate the rings of the hydroelectric turbine may also provide the benefits of flexibility in design and scalability in manufacturing of the turbine structure.

Figure 1:
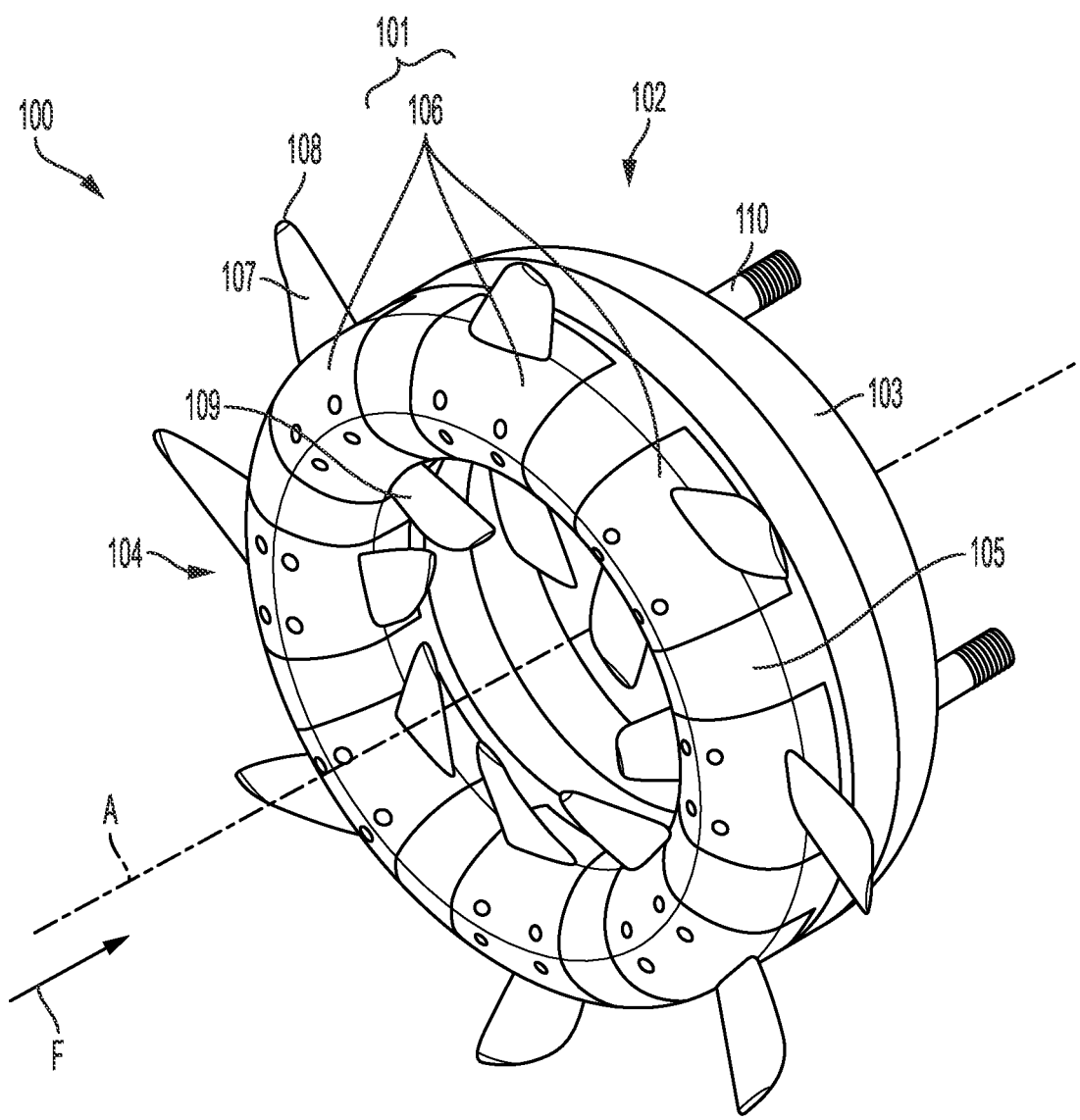
FIG. 1 is a front, perspective view of a hydroelectric energy system in accordance with an embodiment of the present disclosure.
Figure 2:
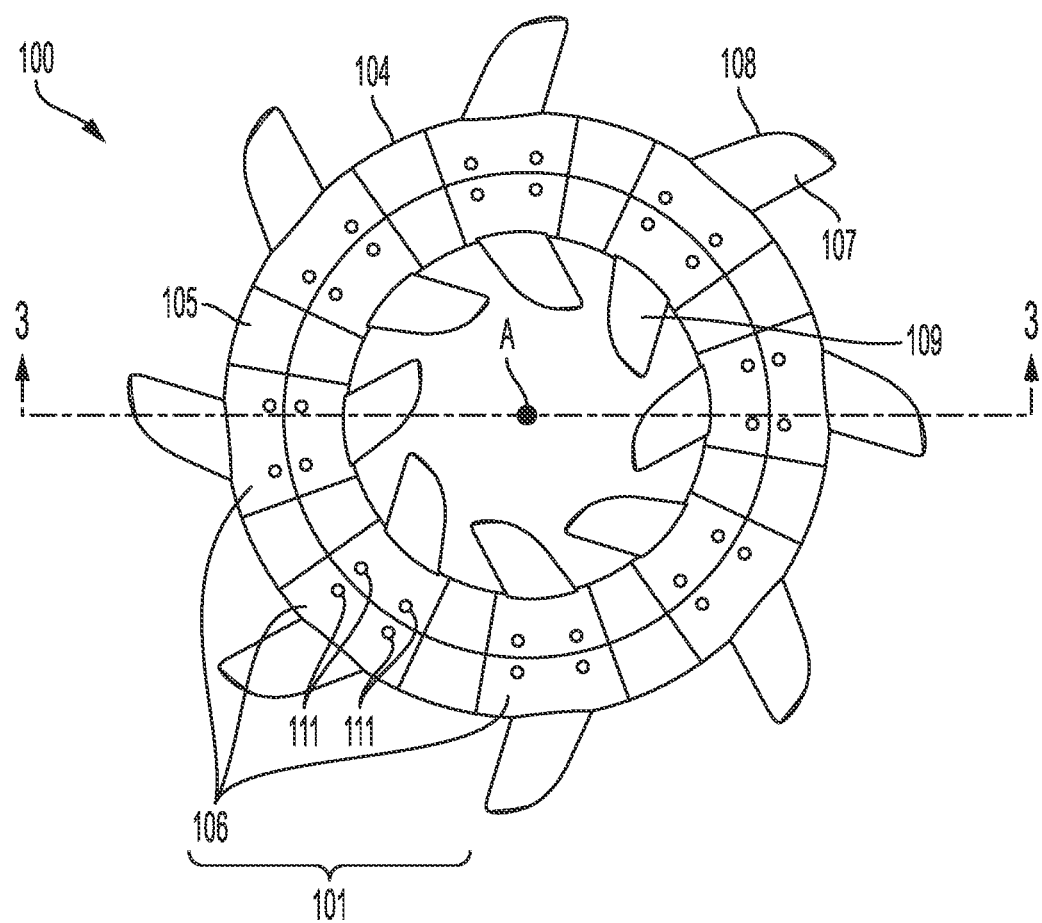
FIG. 2 is a front view of the hydroelectric energy system of FIG. 1.

In one embodiment, for example, the printed hydroelectric turbine structure may have a simple stacked configuration, in which the stationary ring structure is printed first, and the rotating ring structure, which include the blades, is printed over the stationary ring structure. As illustrated in FIG. 1, the stacked nature of the rings is advantageous, for example, when the turbine is positioned in a one-directional fluid flow F having a directional component that is generally parallel to the axis of rotation A (e.g., a one-directional flow F, in which the flow comes from only an upstream side of the turbine), such that, during rotation of the rotating ring structure around the stationary ring structure, the stationary ring structure is in compression and may support the rotating ring structure within the fluid flow F.

With reference now to FIGS. 1-21, a hydroelectric energy system 100 in accordance with the present disclosure is illustrated. The hydroelectric energy system 100 (e.g., hydroelectric turbine 100) includes a stationary ring structure 102 having a first plurality of electricity-generating elements and a rotating ring structure 104 having a second plurality of electricity-generating elements, which is configured to rotate with respect to the stationary ring structure 102 about an axis of rotation A. As discussed above, the system 100 includes a stacked configuration in which the components of the rotating ring structure 104 overlay and are configured to rotate with respect the components of the stationary ring structure 102. For example, as best illustrated perhaps in the enlarged cross-sectional view of FIG. 3A, the stationary ring structure 102 includes a core structure in the form of a stationary ring backing 113 and a stationary ring foundation 112 overlaying (i.e., disposed radially outwardly of) the backing 113. While the rotating ring structure 104 includes a rotating ring foundation 105 overlaying (i.e., disposed radially outwardly of) the stationary ring foundation 112 and a blade support ring 101 overlaying (i.e., disposed radially outwardly of) the rotating ring foundation 105. In this manner, the components of the rotating ring structure 104 (i.e., the rotating ring foundation 105 and the blade support ring 101) are disposed in a generally concentric, cup-like manor relative to the components of the stationary ring structure 102 (i.e., the stationary ring foundation 112 and the stationary ring backing 113) such that the rotating ring structure 104 can rotate around an outside surface of the stationary ring structure 102 about the axis of rotation A. The turbine 100 may further include at least one bearing mechanism configured to support the rotating ring structure 104 relative to the stationary ring structure 102 during rotation of the rotating ring structure 104 around the stationary ring structure 102, as discussed further below.

Figure 3:
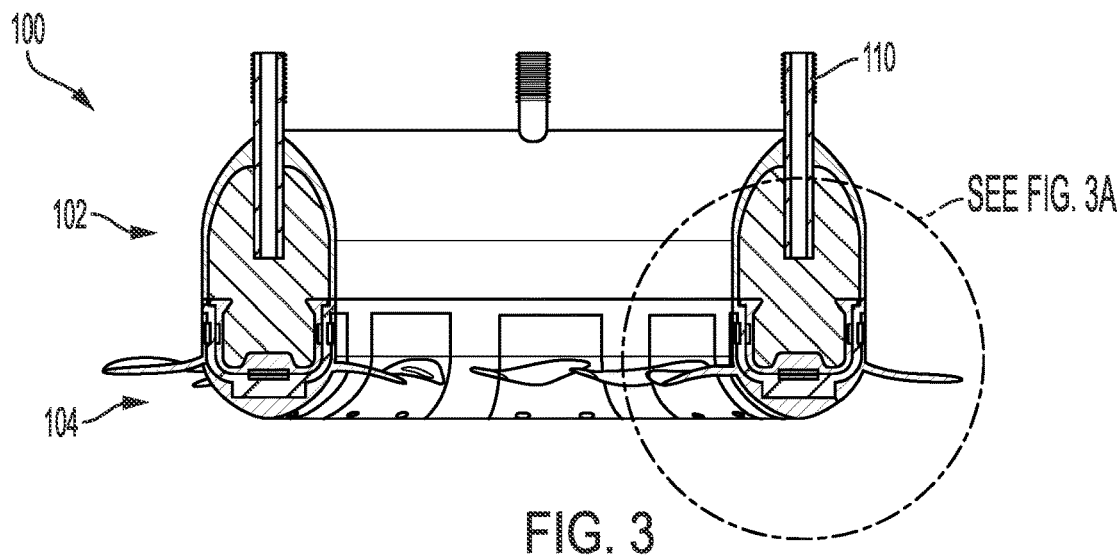
FIG. 3 is a cross-sectional view of the hydroelectric energy system of FIG. 1, taken through section 3-3 of FIG. 2.
Figure 3A:
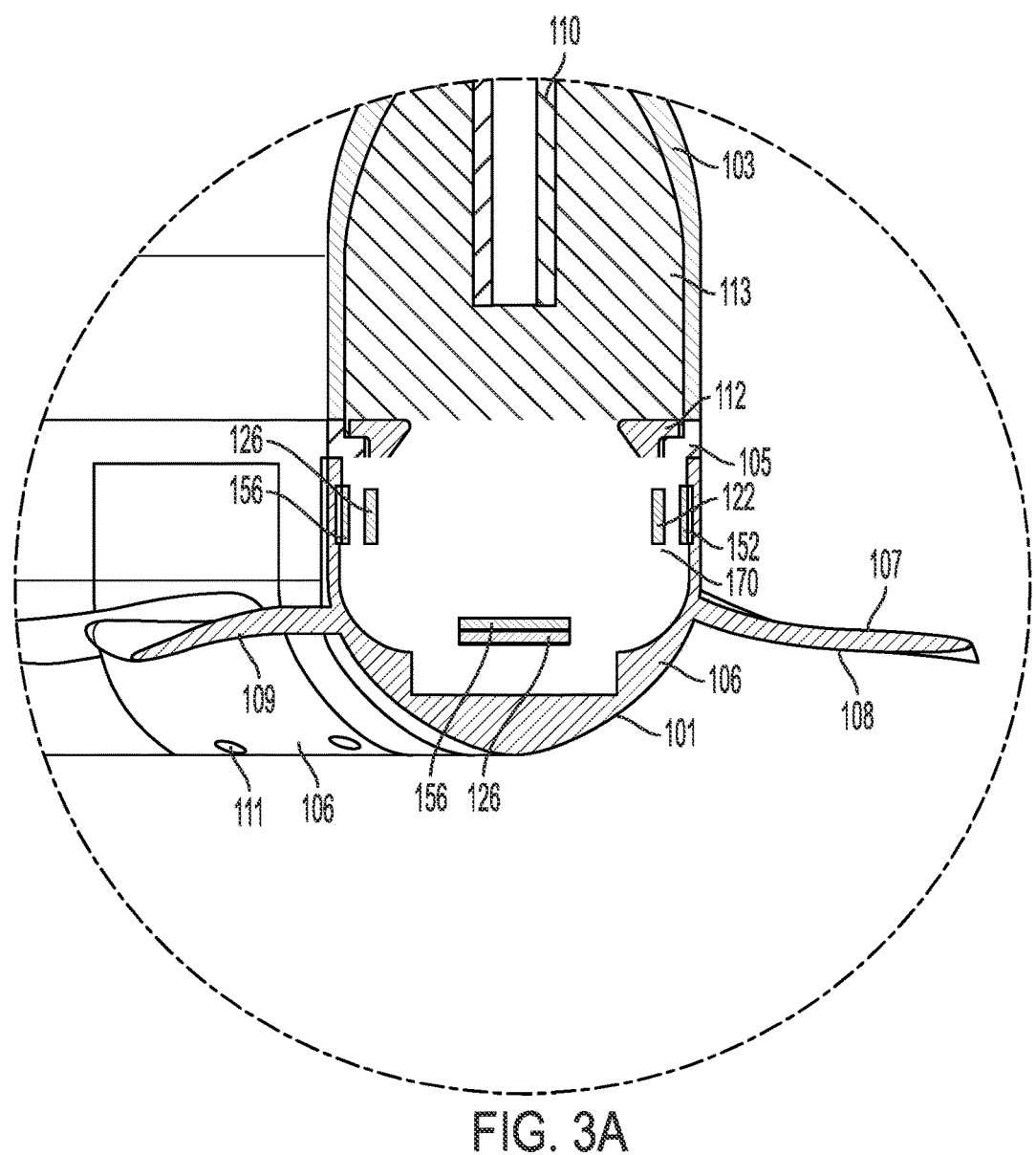
FIG. 3A is enlarged, partial view of the cross-sectional view of FIG. 3.
Figure 5:
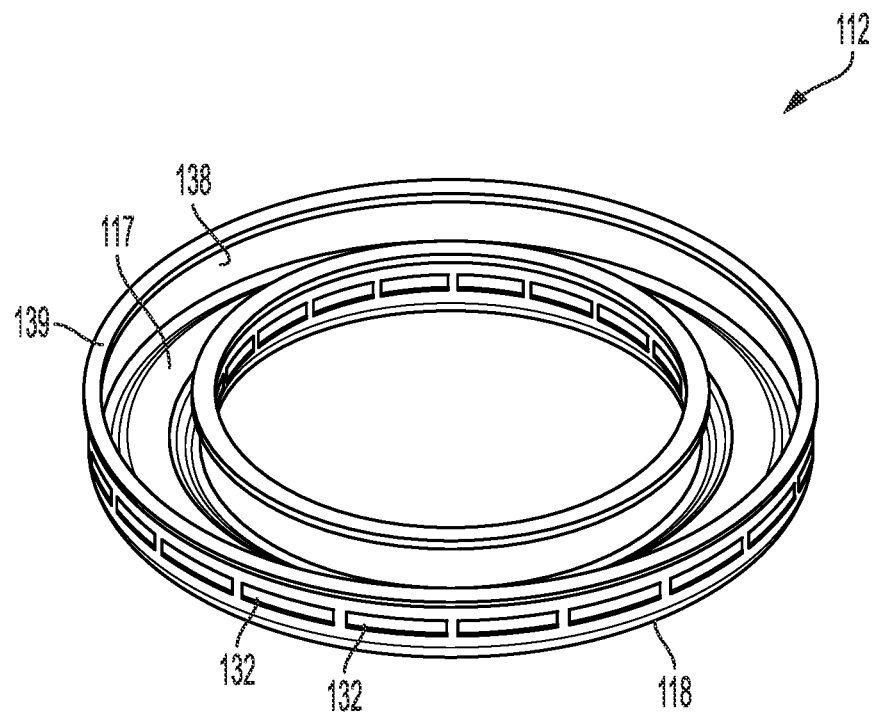
FIG. 5 is a perspective view of a stationary ring foundation of the hydroelectric energy system of FIG. 1.
Figure 6:
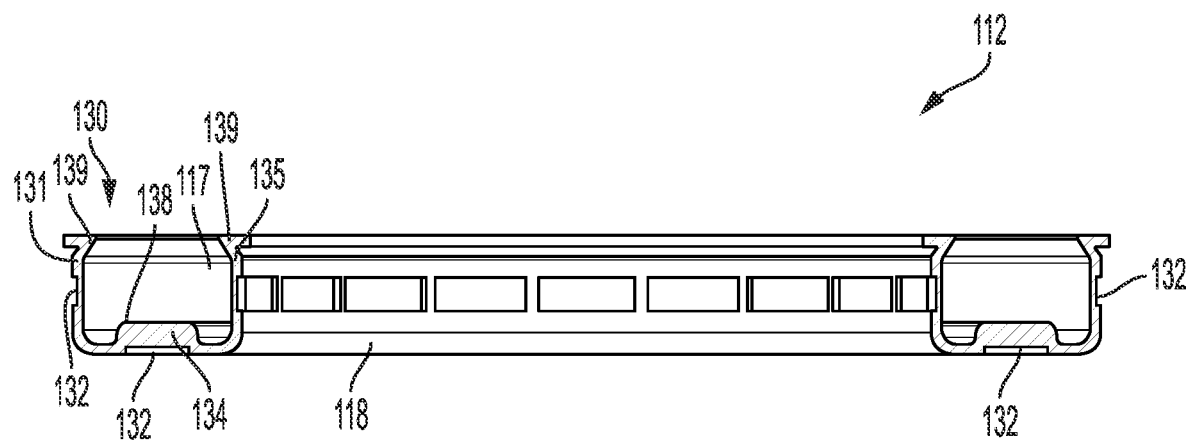
FIG. 6 is a cross-sectional view of the stationary ring foundation of FIG. 5.
Figure 7A:
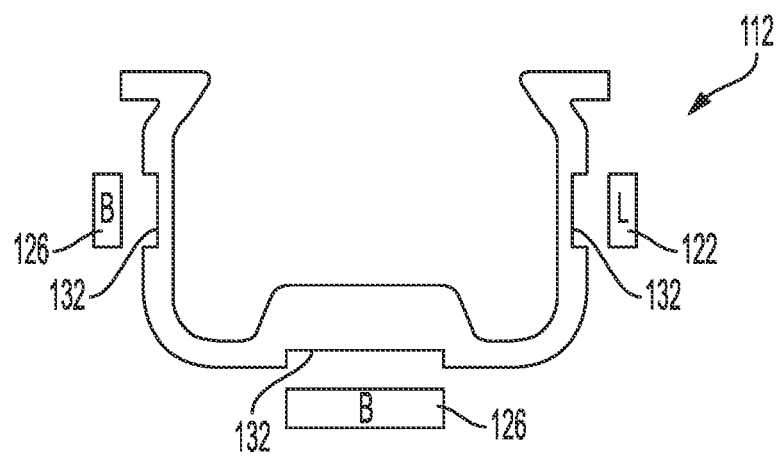
FIGS. 7A-E are schematic, partial, cross-sectional views of stationary ring foundations in accordance with various embodiments of the present disclosure.
Figure 7B:
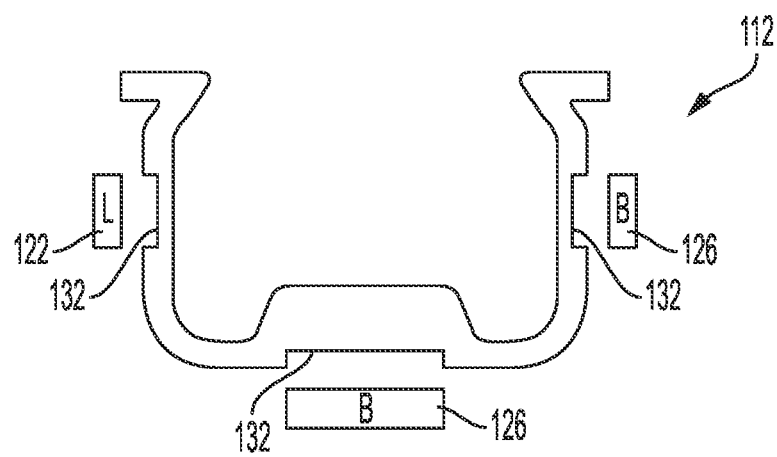
Figure 7C:
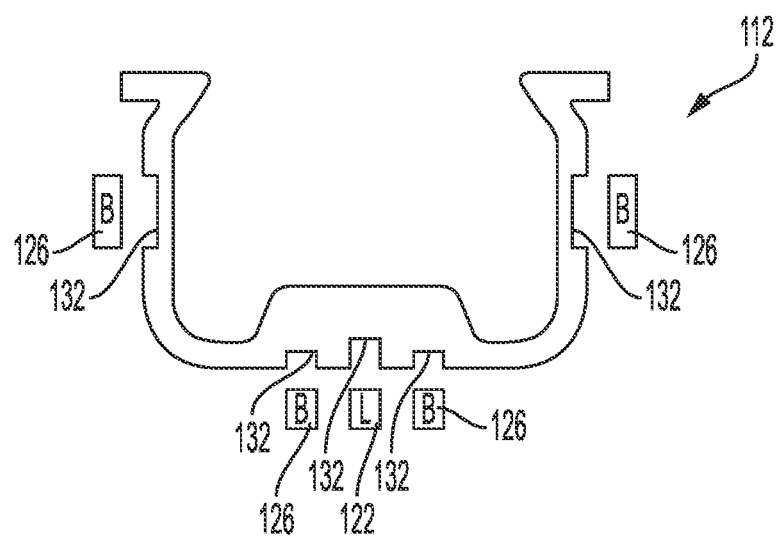
Figure 7D:
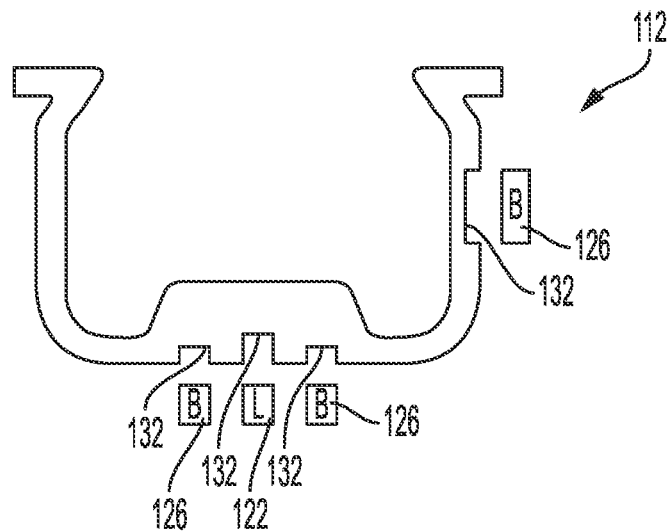
Figure 7E:
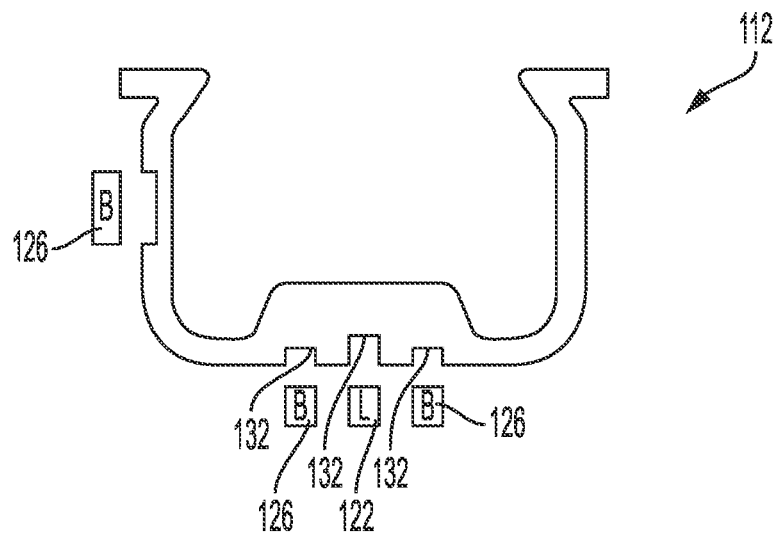

As illustrated in FIG. 3A, the stationary ring backing 113 forms the core structure of the turbine 100 and is disposed at least partially within an opening 117 (see FIGS. 5 and 6) defined by the stationary ring foundation 112. As shown in FIGS. 5 and 6, in one embodiment, the stationary ring foundation 112 has a circular shape, with a U-shaped cross-section 130 defining the opening 117. The U-shaped cross-section 130 includes a base 134 and first and second side walls 131 and 135 extending substantially perpendicular to the base 134. The stationary ring backing 113 is correspondingly sized and shaped to couple with the stationary ring foundation 112, such that at least a portion of the backing 113 fits within and fills the opening 117 of the foundation 112, thereby providing the core structure for the turbine 100. In various embodiments, for example, the backing 113 is made from a pourable and/or extrudable material, such as, for example, a concrete material that is dispensed, during the manufacturing process, into the opening 117 of the stationary ring foundation 112 where it completely fills the opening 117 and hardens to form the backing 113.

In one embodiment, as shown in FIG. 3A, the stationary ring backing 113 may include a stationary ring mold 103, which is disposed around an outer circumferential surface 119 (see FIGS. 14 and 15) of the stationary ring backing 113 to form an outer shell of the backing 113. In such embodiments, the mold 103 and the stationary ring foundation 112 may collectively form an internal cavity (i.e., between the stationary ring mold 103 and the stationary ring foundation 112), which is filled by the material forming the stationary ring backing 113. The mold 103 may, for example, be configured to adjoin the rotating ring structure 104 (e.g., the rotating ring foundation 105, which overlays the stationary ring foundation 112) to form a relatively smooth, continuous outer surface of the turbine 100.

The stationary ring backing 113 is, therefore, designed to function as an internal support structure for the other overlaying components of the turbine 100 (e.g., for the blade support ring 101, the rotating ring foundation 105, and the stationary ring foundation 112), and is configured to support the other components within a fluid flow during operation of the turbine 100. The stationary ring backing 113 is, for example, designed to support the compressive forces (i.e., the stationary ring backing 113 is designed to be in compression) transferred through the turbine 100 from the blade support ring's 101 interactions with a one-directional fluid flow F that is generally parallel to the axis of rotation A.

Those of ordinary skill in the art would understand that the turbines in accordance with the present disclosure may employ various types, shapes, and/or configurations of backings to support the compressive loads of the turbine, which are made from various materials using various techniques, and that the stationary ring backing 113 and mold 103 are exemplary only. In another embodiment, as illustrated in FIGS. 22-25, for example, a hydroelectric energy system (e.g., turbine) 200 may instead only employ a stationary ring backing 213, which is configured to directly adjoin a rotating ring structure 204 (e.g., a rotating ring foundation 205, which overlays a stationary ring foundation 212 of a stationary ring structure 202) to form a relatively smooth, continuous outer surface of the turbine 200, as described further below.

Figure 4:
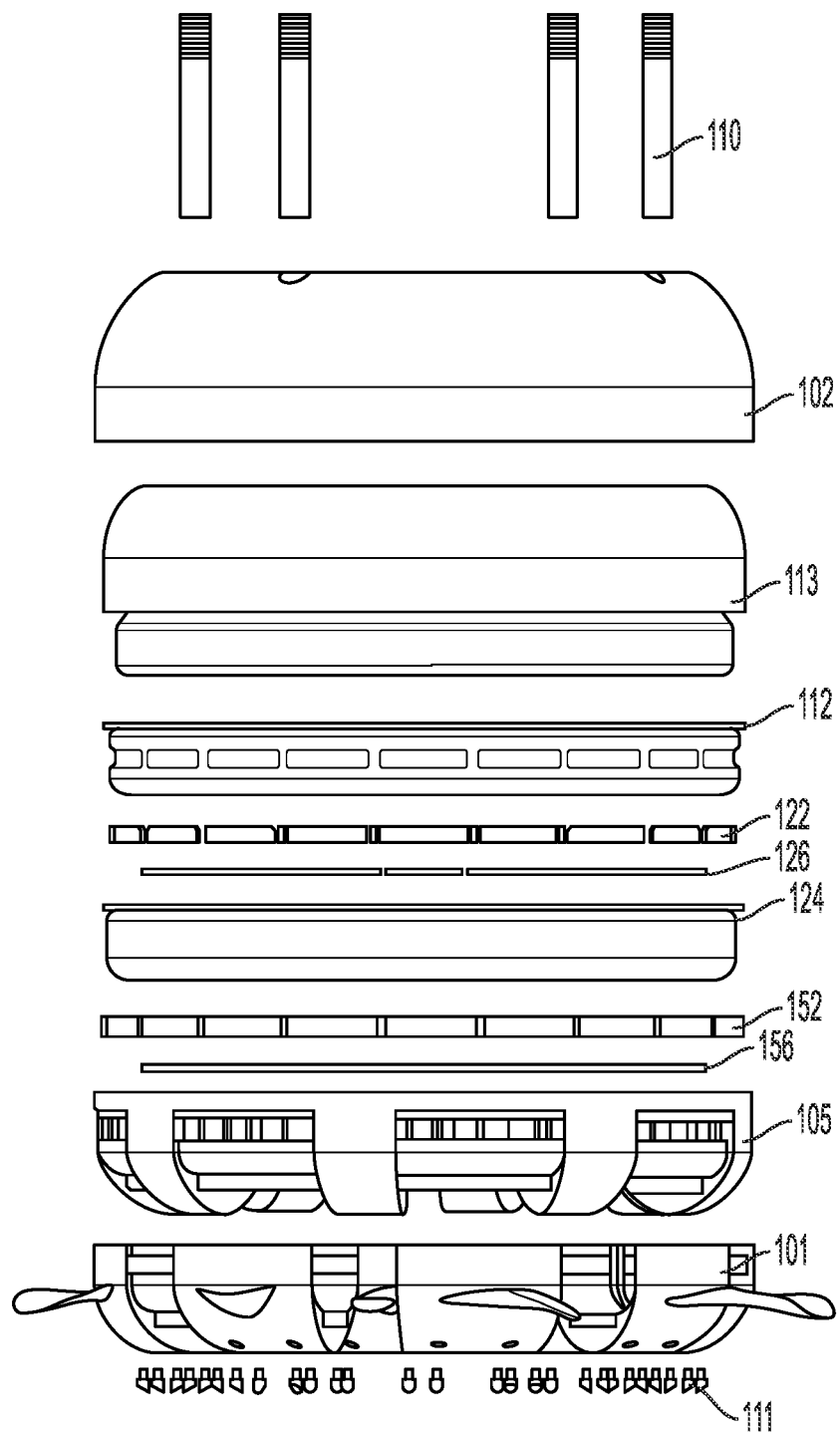
FIG. 4 is an exploded view of the hydroelectric energy system of FIG. 1.

Those of ordinary skill in the art would also understand that the stationary ring backing 113 and/or mold 103 may employ various additional components and/of features to structurally support the turbine 100. As illustrated in FIGS. 12-15, each of the stationary ring backing 113 and the stationary ring mold 103 may include one or more respective openings 141 and 140, which are configured to receive and support one or more legs 110 (see FIGS. 1, 3, and 4) of the turbine 100. The legs 110 may be configured, for example, to support the turbine 100 when the turbine 100 is not deployed (e.g., when the turbine 100 is not supported within the fluid current F). In one embodiment, as illustrated in FIGS. 1, 3, and 4, the turbine 100 may employ four legs 110 spaced equidistant to one another around a periphery of the stationary ring mold 103.

The stationary ring foundation 112 also includes a first plurality of electricity-generating elements 122, such as, for example, one or more laminated coils 122 and a first bearing material 126, such as, for example, one or more bearing plates 126. As illustrated in FIGS. 5-7, the stationary ring foundation 112 may, for example, include one or more slots 132 arranged within the base 134 and/or side walls 131 and 135, which are configured to receive the laminated coils 122 and the bearing plates 126. As illustrated in FIGS. 7A-7E, the stationary ring foundation 112 may have various arrangements of slots 132 configured to receive various arrangements of laminated coils 122 and bearing plates 126, which are positioned and configured to interact with various arrangements of corresponding magnets 152 and bearing plates 156 on the rotating ring foundation 105 (see FIGS. 18A-18E), as discussed further below. Those of ordinary skill in the art will understand that the stationary ring foundation 112 described and illustrated with respect to FIGS. 3-7 is exemplary only, and that the present disclosure contemplates stationary ring foundations having various shapes and configurations, and having various arrangements of slots, for receipt of various types, configurations and/or arrangements of first electricity-generating elements 122 (e.g., laminated coils 122) and first bearing materials 126 (e.g., bearing plates 126).

Figure 8:
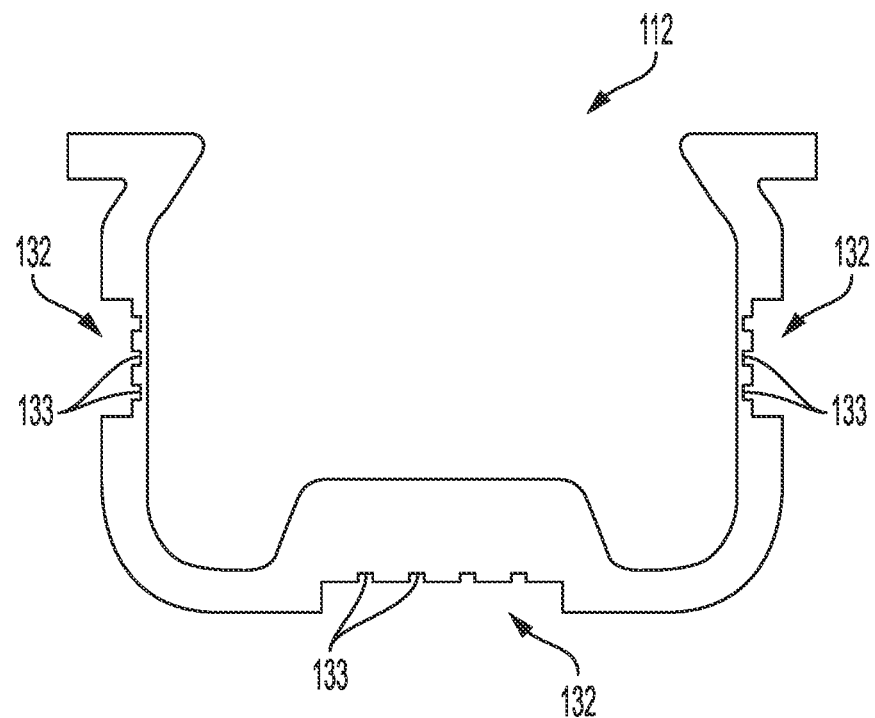
FIG. 8 is a schematic, partial, cross-sectional view of a stationary ring foundation in accordance with another embodiment of the present disclosure.
Figure 9:
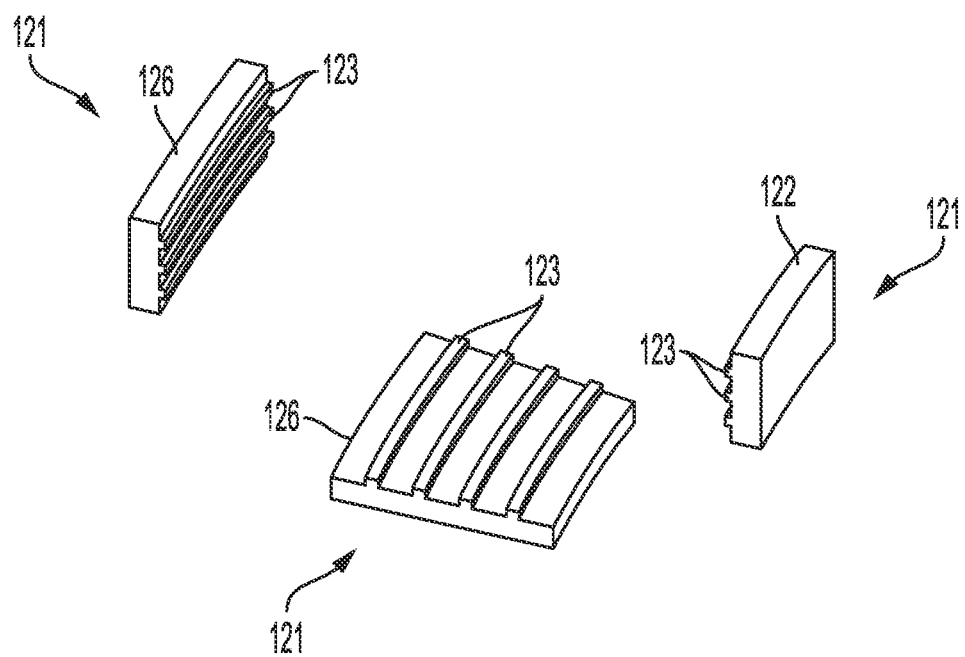
FIG. 9 is a perspective view of one set of interlocking blocks, for receipt within the stationary ring foundation of FIG. 8, in accordance with an embodiment of the present disclosure.
Figure 10:
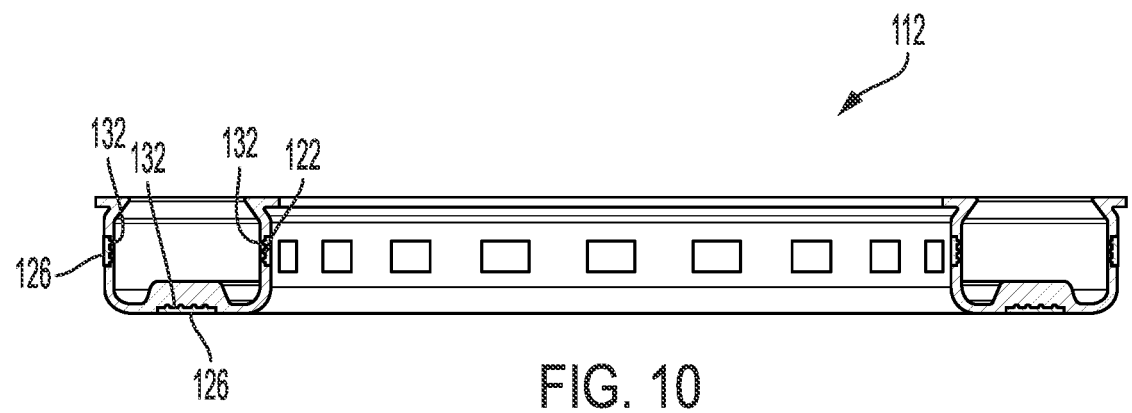
FIG. 10 is a cross-sectional view of the stationary ring foundation of FIG. 8, incorporating multiple laminated coil interlocking blocks, in accordance with an embodiment of the present disclosure.
Figure 11:
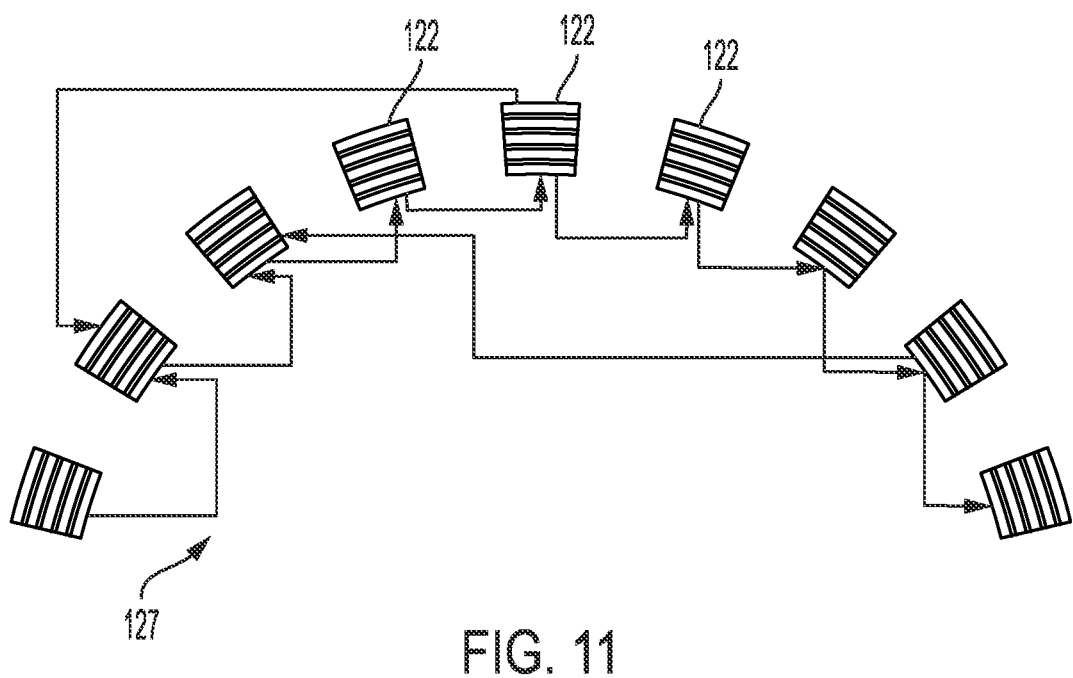
FIG. 11 is a partial, schematic diagram illustrating a wiring harness, for linking the laminated coil interlocking blocks, in accordance with an embodiment of the present disclosure.
Figure 12:
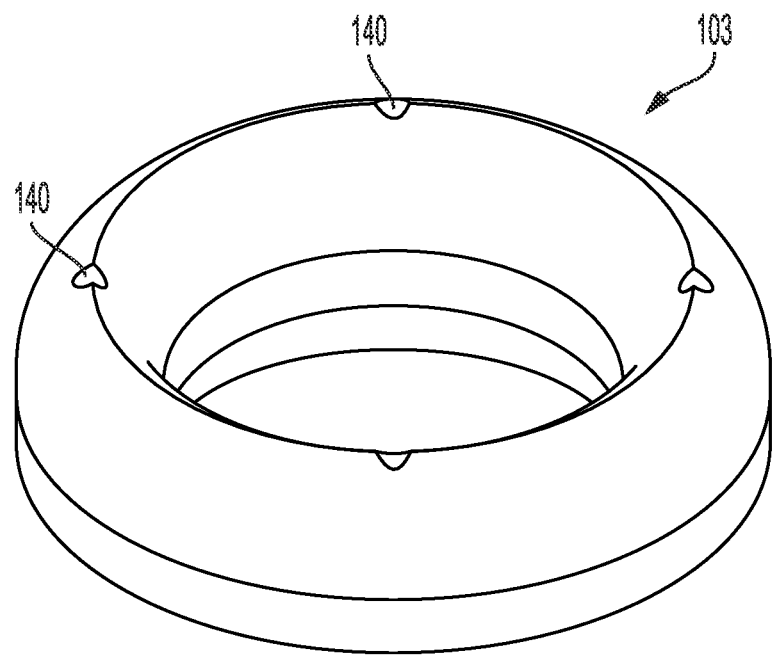
FIG. 12 is a perspective view of a stationary ring mold of the hydroelectric energy system of FIG. 1.
Figure 13:
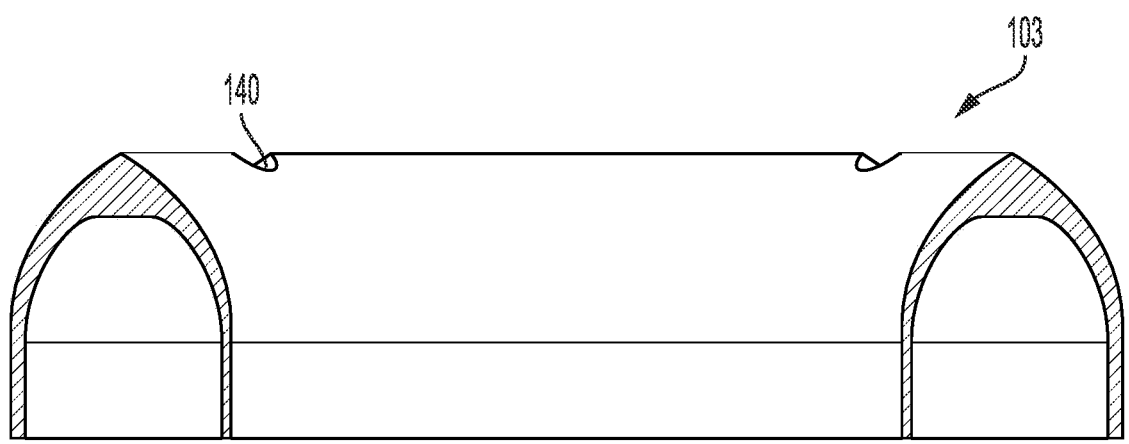
FIG. 13 is a cross-sectional view of the stationary ring mold of FIG. 12.
Figure 14:
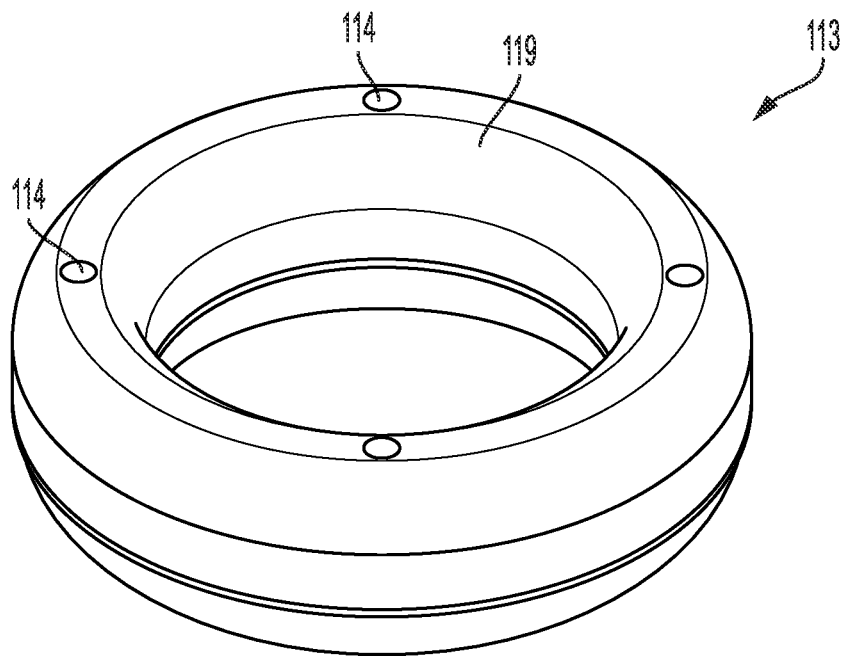
FIG. 14 is a perspective view of a stationary ring backing of the hydroelectric energy system of FIG. 1.
Figure 15:
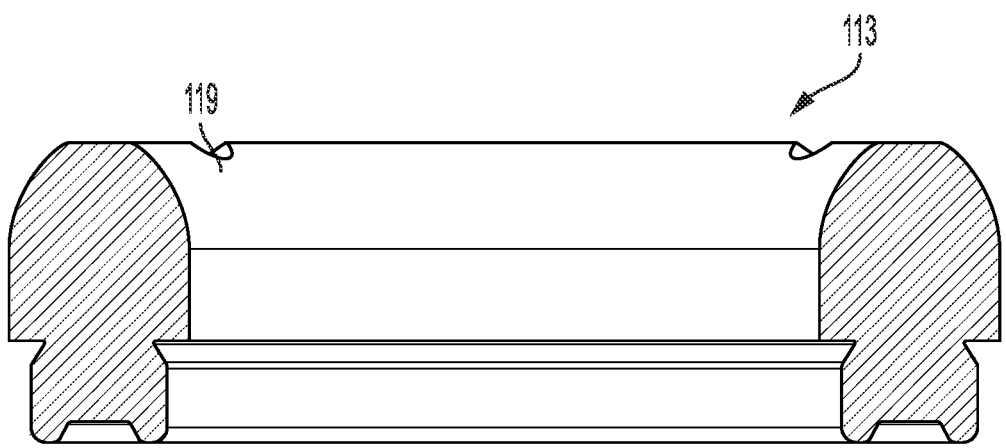
FIG. 15 is a cross-sectional view of the stationary ring backing of FIG. 14.

Furthermore, the laminated coils 122 and the bearing plates 126 can be situated within the slots 132, for example during the printing process described further below, using various methods and/or techniques. In one embodiment, for example, the laminated coils 122 are arranged in a ring with an iron backing that is configured to mount the coils 122 within the slots 132. Each iron backing may, for example, include one or more pegs (not shown) that engage with the slots 132, and the laminated coils 122 may then be epoxied in place within the slots 132. In another embodiment, as shown in FIGS. 8-10, each of the laminated coils 122 and the bearing plates 126 may be encapsulated in a respective block (e.g., LEGO®-type block) 121, which is configured to be received within and to interlock with a respective slot 132 in the foundation 112, such that the coils 122 and the plates 126 are each arranged in a ring around a periphery of the stationary ring foundation 112. Each block 121, may for example, include raised interlocking features 123 that are configured to mate with corresponding recessed interlocking features 133 within each slot 132. As illustrated in FIG. 11, the laminated coils 122 may then be linked together by a wiring harness 127 to facilitate the transfer of electricity from the turbine 100 to its applied application, as would be understood by those of ordinary skill in the art. In one embodiment, for example, wires from the wiring harness 127 may run out from the legs 110 of the turbine 100.

Figure 16:
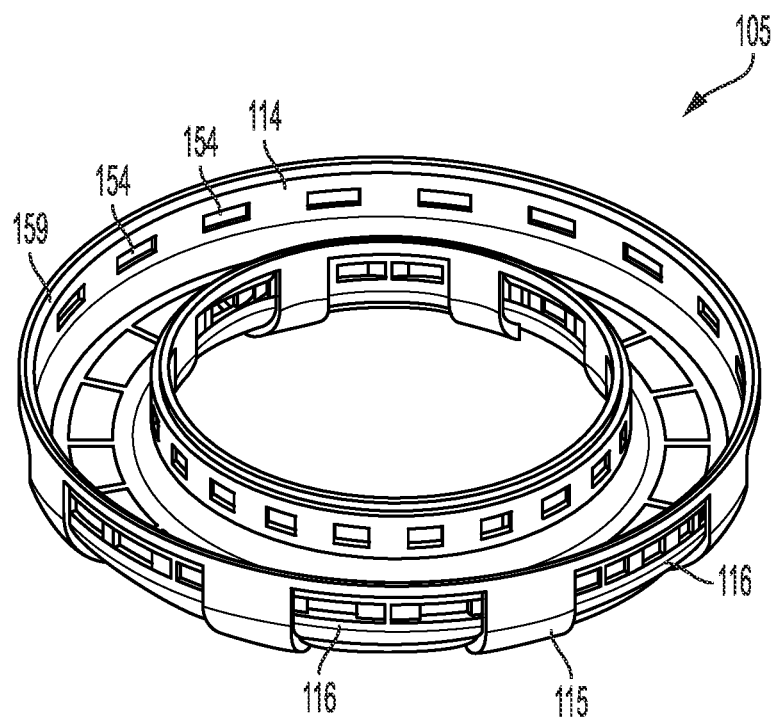
FIG. 16 is a perspective view of a rotating ring foundation of the hydroelectric energy system of FIG. 1
Figure 17:
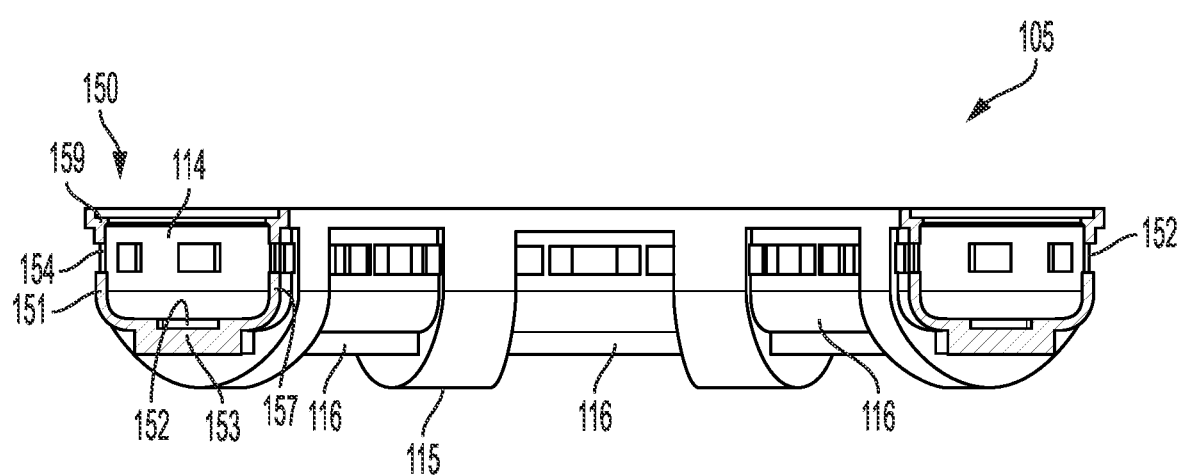
FIG. 17 is a cross-sectional view of the rotating ring foundation of FIG. 16.
Figure 18A:
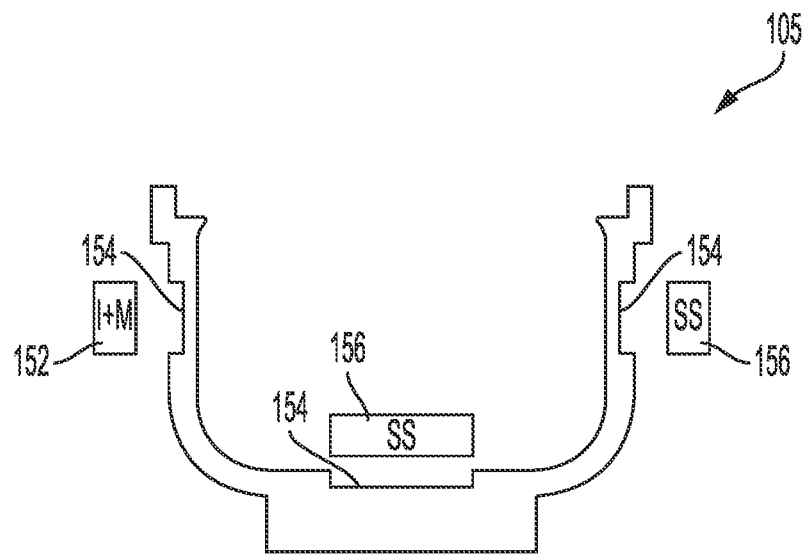
FIGS. 18A-E are schematic, partial, cross-sectional views of rotating ring foundations in accordance with various embodiments of the present disclosure.
Figure 18B:
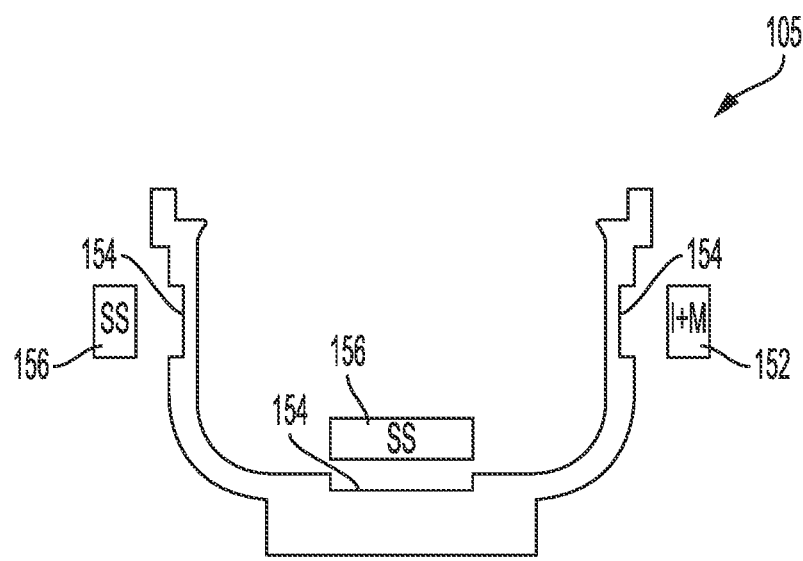
Figure 18C:
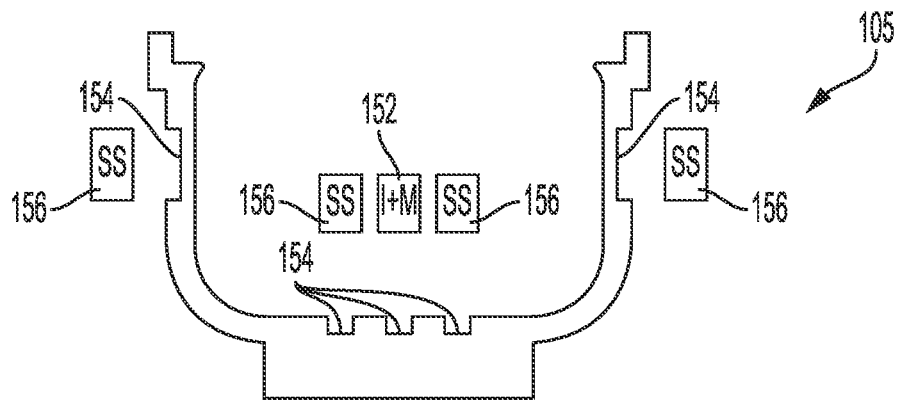
Figure 18D:
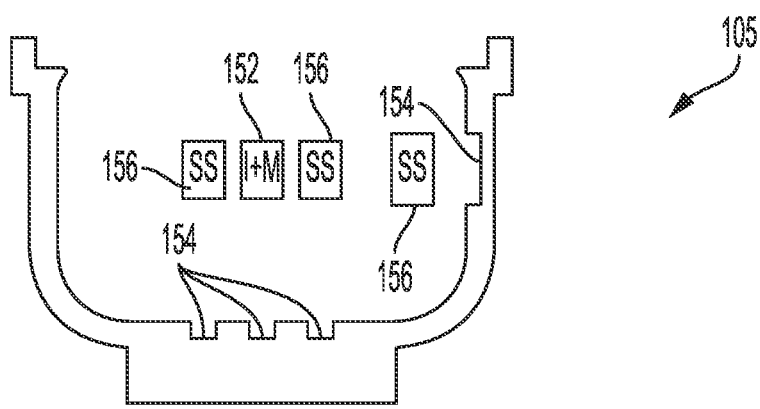
Figure 18E:
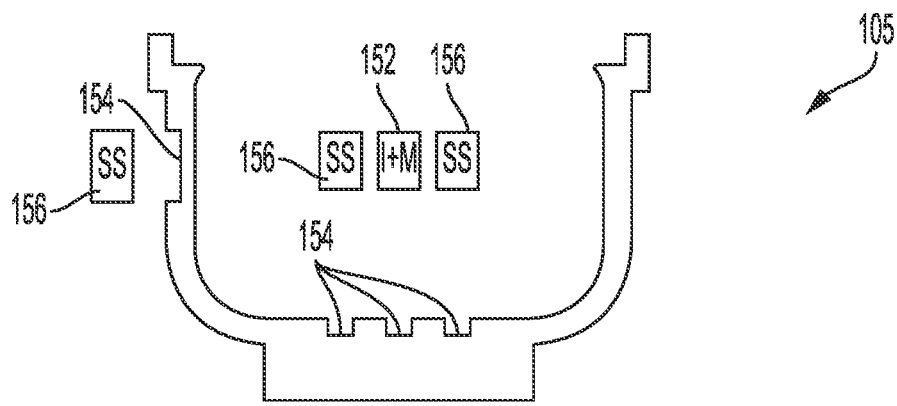

As further illustrated in FIG. 3A, the rotating ring structure 104 includes a rotating ring foundation 105 that is disposed radially outward of an outer circumferential surface 118 (see FIGS. 5 and 6) of the stationary ring foundation 112. As shown in FIGS. 16 and 17, in one embodiment, the rotating ring foundation 105 has a circular shape, with a U-shaped cross-section 150, including a base 153 and first and second side walls 151 and 157 extending substantially perpendicular to the base 153. The rotating ring foundation 105 is correspondingly sized and shaped to overlay and couple with the stationary ring foundation 112.

Similar to the stationary ring foundation 112, the rotating ring foundation 105 includes a second plurality of electricity-generating elements 152, such as, for example, one or more laminated magnets 152 and a second bearing material 156, such as, for example, one or more bearing plates 156. As illustrated in FIGS. 16-18, the rotating ring foundation 105 may, for example, include one or more slots 154 arranged within the base 153 and/or side walls 151 and 157, which are configured to receive the laminated magnets 152 and the bearing plates 156. As illustrated in FIGS. 18A-18E, the rotating ring foundation 105 may have various arrangements of slots 154 configured to receive various arrangements of laminated magnets 152 and bearing plates 156, which are positioned and configured to interact with corresponding laminated coils 122 and bearing plates 126 on the stationary ring foundation 112 (see FIGS. 7A-7E), as the rotating ring foundation 105 rotates relative to the stationary ring foundation 112. Those of ordinary skill in the art will understand that the rotating ring foundation 105 described and illustrated with respect to FIGS. 3 and 16-18 are exemplary only, and that the present disclosure contemplates rotating ring foundations having various shapes and configurations, and having various arrangements of slots, for receipt of various types, configurations and/or arrangements of second electricity-generating elements 152 (e.g., laminated magnets 152) and second bearing materials 156 (e.g., bearing plates 156). The magnets 152 and the bearing plates 156 can also be situated within the slots 154 (e.g., also during the printing process) using various methods and/or techniques, including, for example, via respective LEGO®-type blocks, which are configured to be received within and to interlock with respective slots 154 in the foundation 105, as described above with respect to the coils 122 and the bearing plates 126.

The rotating ring structure 104 also includes a blade support ring 101 that is disposed radially outward of an outer circumferential surface 115 (see FIGS. 16 and 17) of the rotating ring foundation 105, such that it is configured to interact with the fluid current F to rotate the rotating ring foundation 105 with respect to the stationary ring foundation 112. The blade support ring 101 includes a plurality of blades 108, eight blades 108 being shown in the embodiment of FIG. 1, which are configured to interact with the fluid current F. Each blade 108 may, for example, have a first blade portion 109 extending radially inward with respect to the blade support ring 101 and a second blade portion 107 extending radially outward with respect to the blade support ring 101.

Figure 19A:
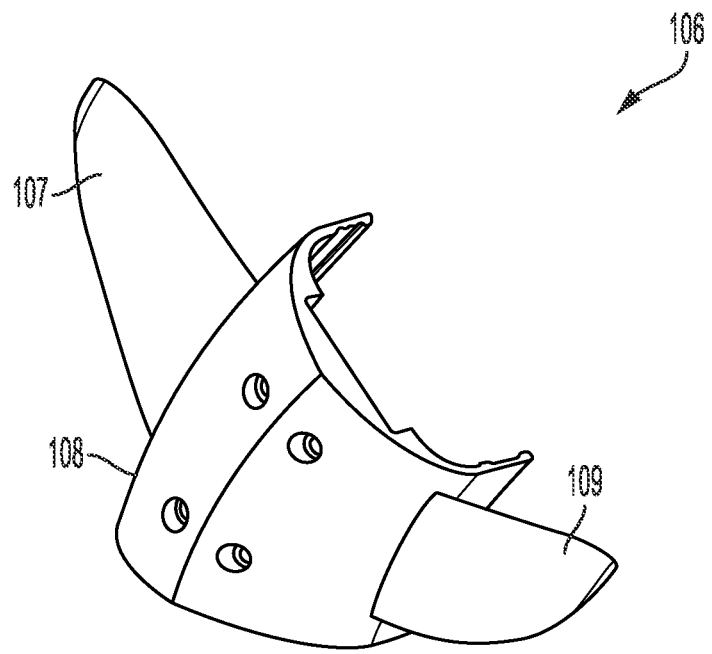
FIGS. 19A and B are cross-sectional views of one section of a blade support ring in accordance with an embodiment of the present disclosure.
Figure 19B:
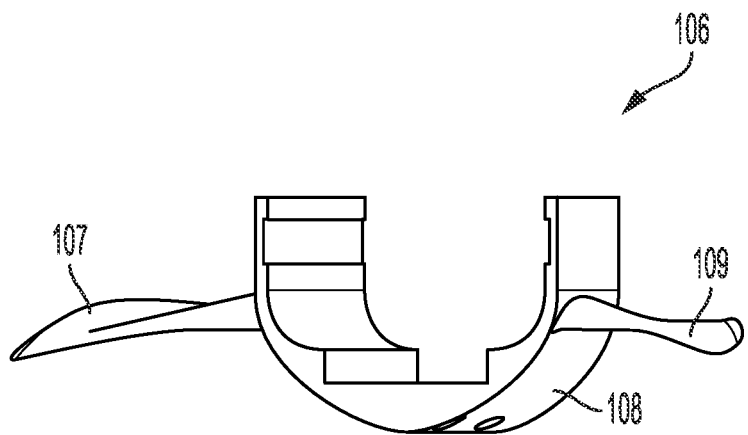

As illustrated in in FIGS. 4, 19A, and 19B, in one embodiment, the blade support ring 101 comprises a plurality of blade support segments 106, each blade support segment 106 including one of the plurality of blades 108, with the blade support segments 106 all being arranged in a ring around a periphery of the rotating ring foundation 105. In such embodiments, as illustrated best perhaps in FIGS. 16 and 17, the rotating ring foundation 105 may include a plurality of slots 116 arranged within its outer circumferential surface 115, each slot 116 being configured to receive and secure a respective blade support segment 106. The blade support segments 106 may, for example, be secured within the slots 116 via bolts 111 (see FIG. 4). Those of ordinary skill in the art would understand, however, that the blade support segments 106 may be secured to/within the slots 116 via any known methods and/or techniques, without departing from the scope of the present disclosure and claims.

Figure 20:
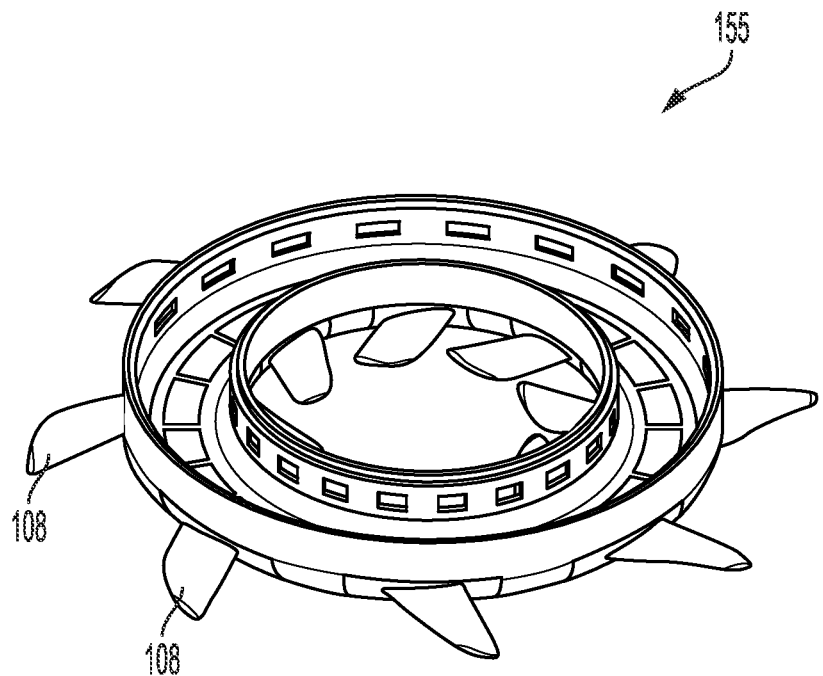
FIG. 20 is a perspective view of a rotating ring foundation in accordance with another embodiment of the present disclosure.
Figure 21:
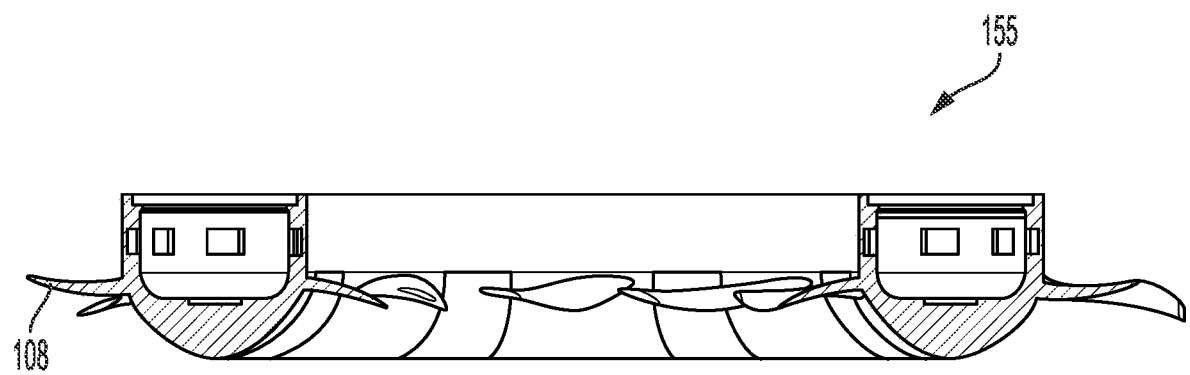
FIG. 21 is a cross-sectional view of the rotating ring foundation of FIG. 20.
Figure 22:
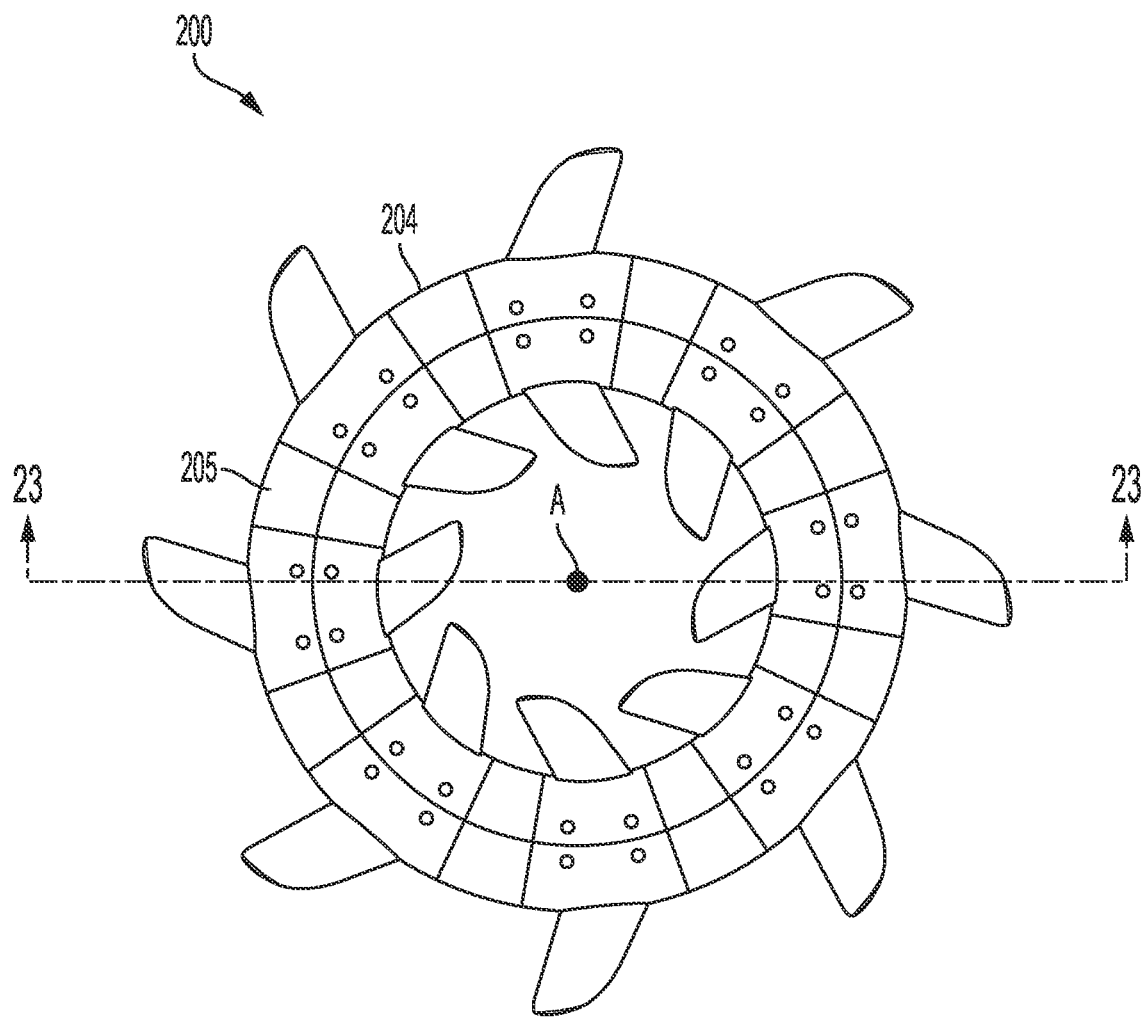
FIG. 22 is a front view of a hydroelectric energy system in accordance with another embodiment of the present disclosure.
Figure 23:
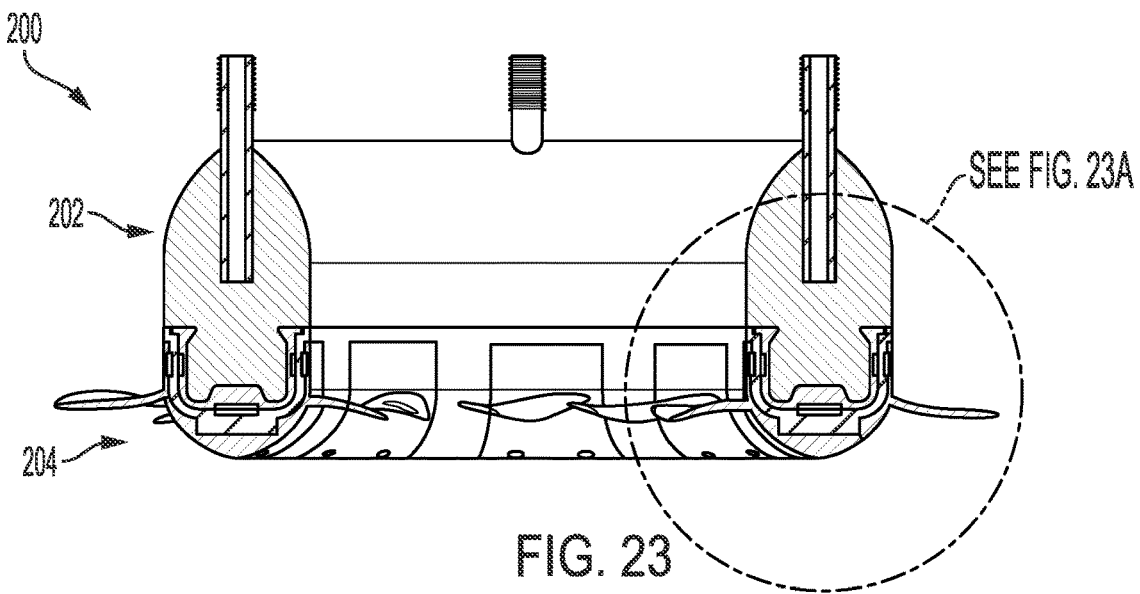
FIG. 23 is a cross-sectional view of the hydroelectric energy system of FIG. 22, taken through section 23-23 of FIG. 22.
Figure 23A:
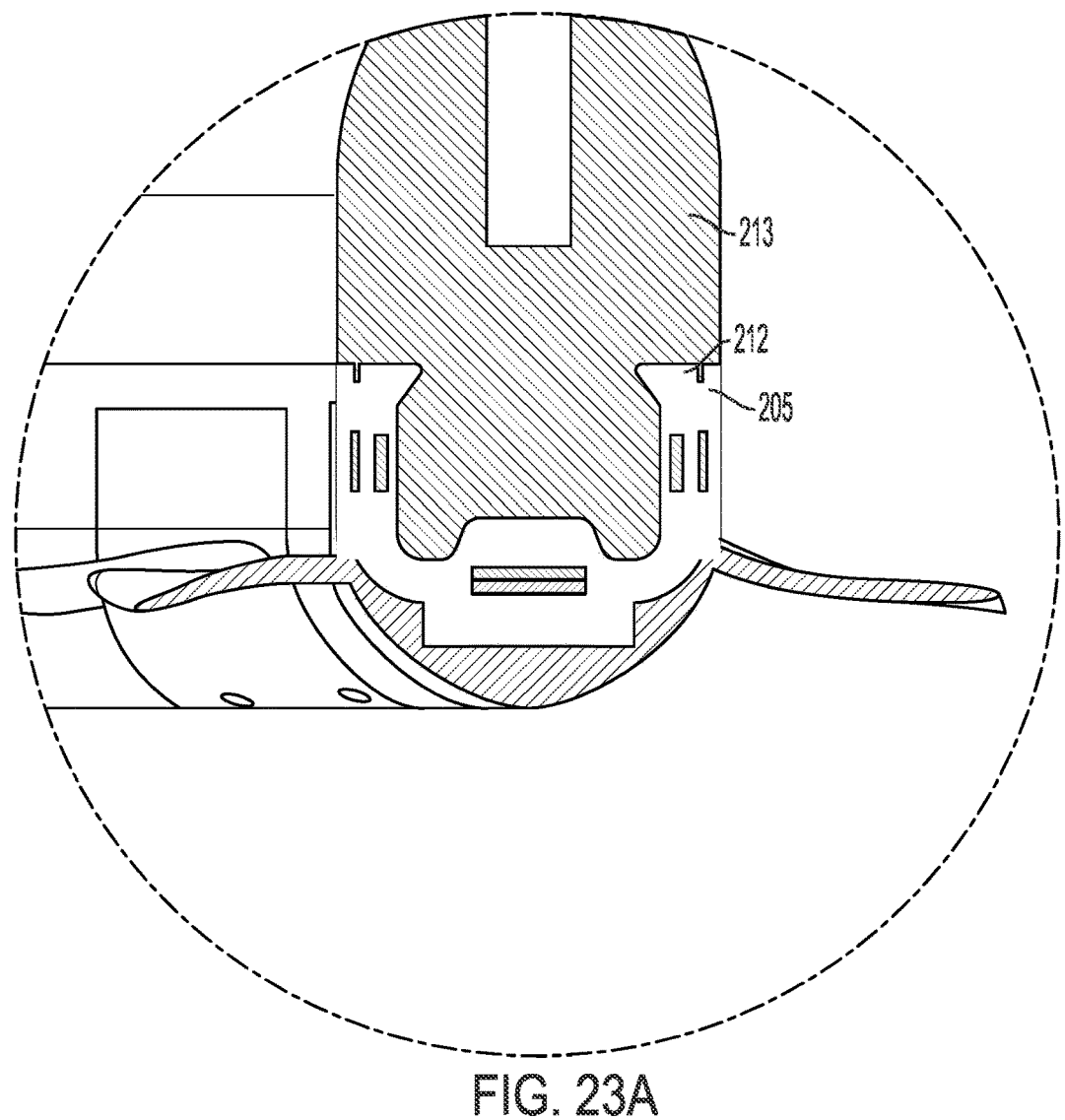
FIG. 23A is enlarged, partial view of the cross-sectional view of FIG. 23.
Figure 24:
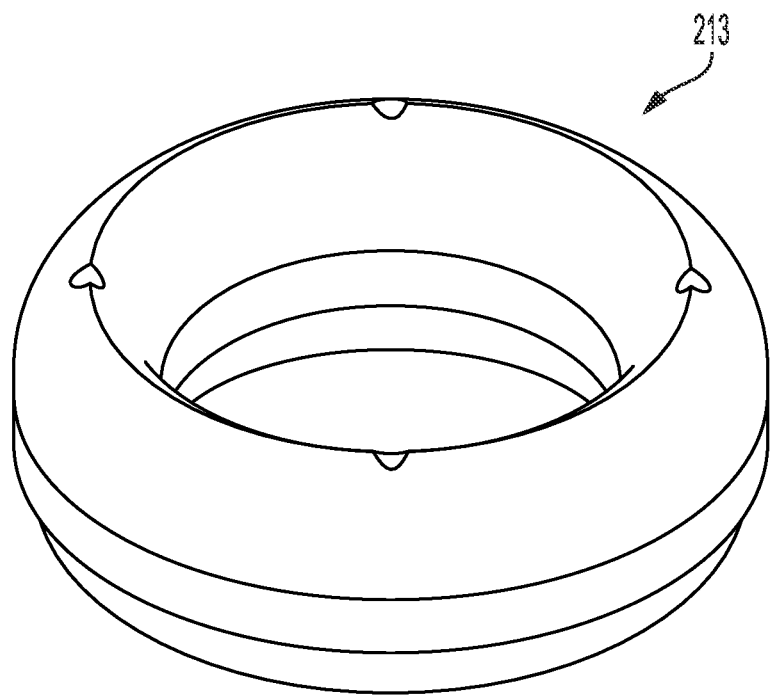
FIG. 24 is a perspective view of a stationary ring backing of the hydroelectric energy system of FIG. 22.
Figure 25:
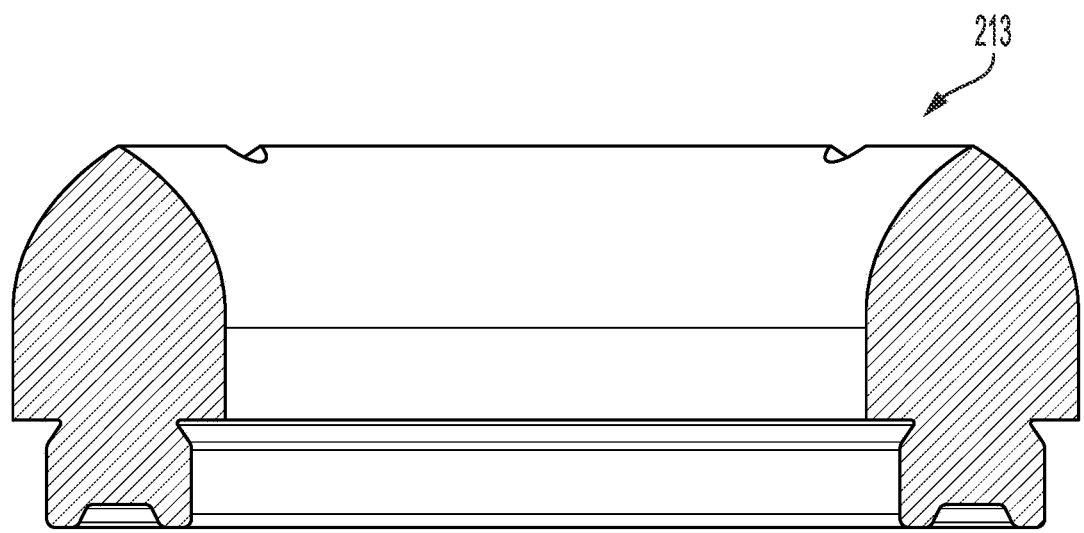
FIG. 25 is a cross-sectional view of the stationary ring backing of FIG. 24.

Those of ordinary skill in the art would further understand that the blade support ring 101 illustrated in FIGS. 4, 19A, and 19B is exemplary only and that blade support rings in accordance with the preset disclosure may include various shapes, designs, and/or configurations of blades 108. In another embodiment, for example, as illustrated in FIGS. 20 and 21, the rotating ring foundation may incorporate the blade support ring, such that the rotating ring foundation and the blade support ring are a single, monolithic rotating structure 155, with the blades 108 being arranged around an outer periphery of the structure 155.

As discussed above, the turbine 100 also includes at least one bearing mechanism (e.g., the first bearing material 126 and the second bearing material 156) that is configured to support the rotating ring structure 104 relative to the stationary ring structure 102 (e.g., radially and/or axially) during rotation of the rotating ring foundation 105 around the stationary ring foundation 112. In accordance with various embodiments, the first and second bearing materials 126 and 156 may include water lubricated bearing plates positioned within respective slots 132 and 154 on the stationary ring foundation 112 and the rotating ring foundation 105, as illustrated in FIGS. 7A-7E and 18A-18E. The bearing plates 126 on the stationary ring foundation 112 may include, for example, strips made of wood or a wood composite, such as, for example, as commercially available from Lignum-Vitae North America of Powhatan Virginia, and/or a composite material, such as, for example, Vesconite, while the bearing plates 156 on the rotating ring foundation 105 may include a carbon fiber and/or a stainless steel material. As illustrated in FIG. 3A, the bearing plates 126 and 156 may be positioned relative to each other, such that, during operation of the turbine 100, a gap 170 (i.e., between the stationary ring foundation 112 and the rotating ring foundation 105) is created and flooded with fluid (e.g., water from the environment in which the turbine is operating) to lubricate the plates 126 and 156 and create a hydrodynamic bearing effect.

Figure 40:
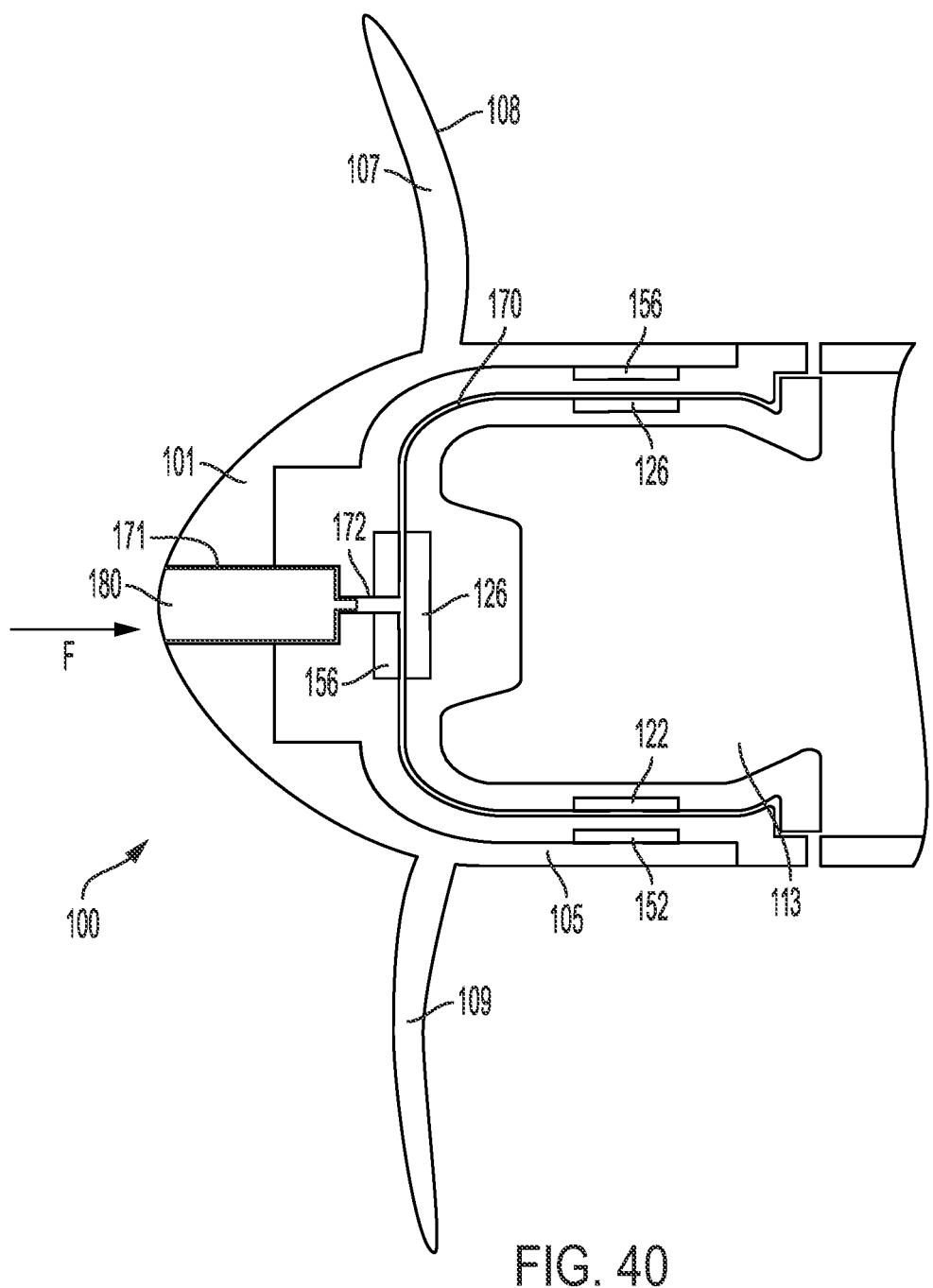
FIG. 40 is a schematic, partial, cross-sectional view of a hydroelectric energy system incorporating a filtration mechanism in accordance with an embodiment of the present disclosure.

In other words, the bearing plates 126 may be positioned along an outer circumferential surface 118 of the stationary ring foundation 112 and be arranged opposite to the bearing plates 156, which are positioned along an inner circumferential surface 114 and/or an outer circumferential surface 115 of the rotating ring foundation 105. In this manner, when there is no fluid in the system, the bearing materials rub against each other (i.e., there is no gap between the surfaces), and when fluid (e.g., sea water) is introduced, the gap 170 is formed, such that the fluid flowing in the gap 170 may provide a hydrodynamic bearing effect (i.e., between the surfaces of the plates 126 and 156) to contain the radial and axial loads of the turbine 100. When employing such hydrodynamic bearings, as illustrated in FIG. 40, the turbine 100 may also include a filtration mechanism 180, which is configured to filter debris and/or particulate matter out of the fluid flow F before the fluid enters the gap 170, as discussed further below, and as disclosed in International Patent Application entitled, "Filtration Systems and Methods for Hydroelectric Turbines," filed concurrently herewith, the entire contents of which are incorporated by reference herein.

As will be understood by those of ordinary skill in the art, the bearing mechanism, including the hydrodynamic bearing mechanism describe above, with the bearing plates 126 and 156 shown and described with respect to FIGS. 3A, FIGS. 7A-7E, and 18A-18E, are exemplary only and may have various arrangements and configurations of plates, formed from various materials, and/or may be used in conjunction with any known bearing mechanism and/or system. Various additional embodiments also contemplate printing the bearing material directly onto the surfaces of the stationary ring foundation 112 and/or the rotating ring foundation 105, as discussed further below.

Figure 26:
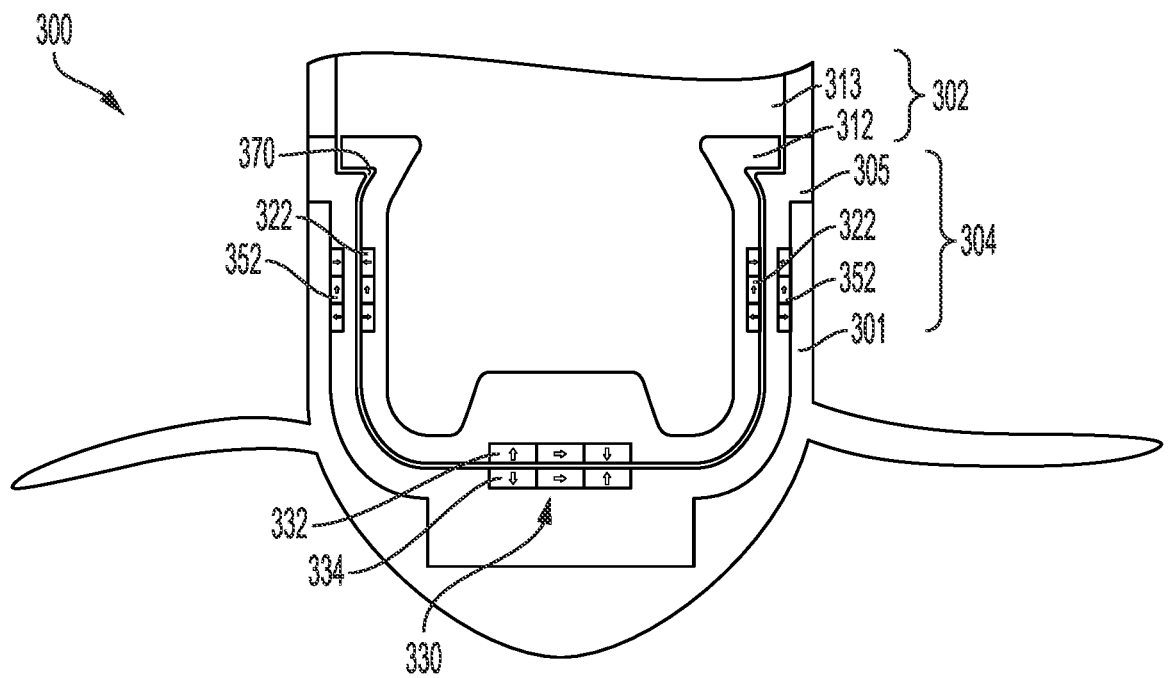
FIG. 26 is a schematic, enlarged, partial, cross-sectional view of a hydroelectric energy system in accordance with another embodiment of the present disclosure.

Furthermore, other types, configurations, and arrangements of bearings that may support the rotating ring structure 104 with respect to the stationary ring structure 102 (axially and/or radially) are also possible, including, for example, magnetic bearings as illustrated in FIGS. 26-29. As shown in FIG. 26, a hydroelectric turbine 300 may include a rotating ring structure 304 (i.e., including a rotating ring foundation 305 with second electricity-generating elements 352, and a blade support ring 301), which is supported relative to a stationary ring structure 302 (i.e., including a stationary ring foundation 312 with first electricity-generating elements 322, and a stationary ring backing 313) via a magnetic bearing mechanism 330. The magnetic bearing mechanism may include, for example, a first partial Halbach magnet array 332 on the stationary ring foundation 312 that is positioned opposite to a second partial Halbach magnet array 334 on the rotating ring foundation 305. In accordance with various embodiments, similar to the hydrodynamic bearings described above, the magnet arrays 332 and 334 may be positioned relative to each other, such that, during operation of the turbine 300, a gap 370 (i.e., between the stationary ring foundation 312 and the rotating ring foundation 305) is created and flooded with fluid (e.g., water from the environment in which the turbine is operating) to separate and facilitate a repulsive effect between the magnet arrays 332 and 334.

Figure 27:
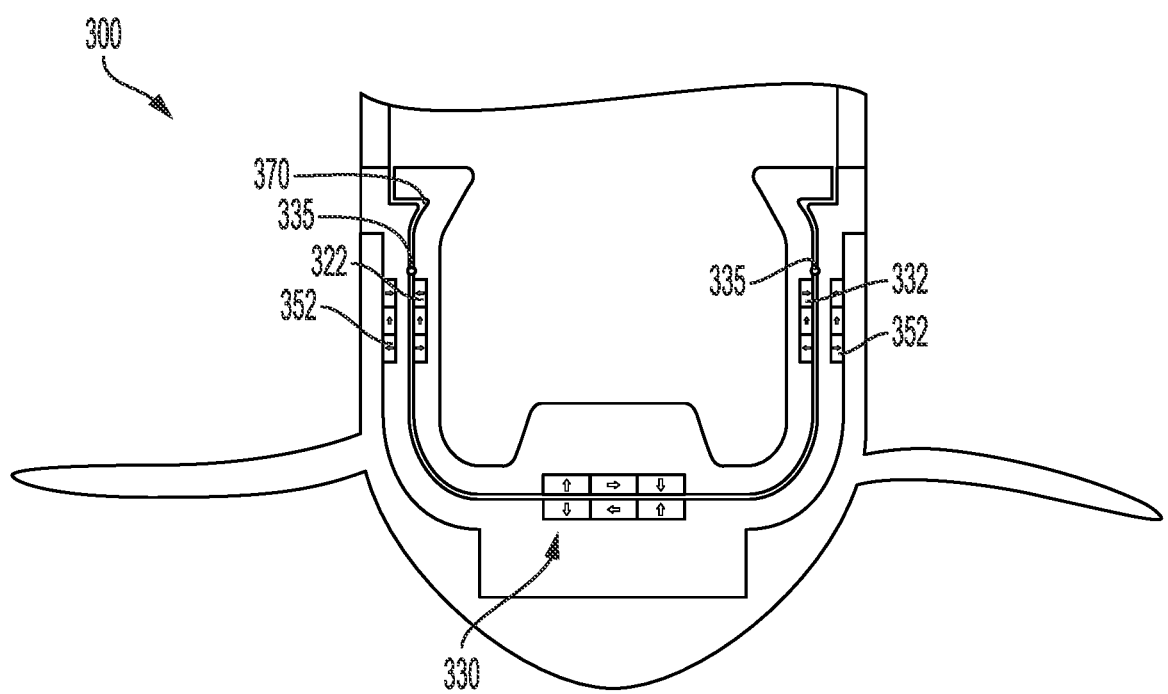
FIG. 27 is a schematic, enlarged, partial, cross-sectional view of the hydroelectric energy system of FIG. 26 illustrating a first O-ring configuration in accordance with an embodiment of the present disclosure.
Figure 28:
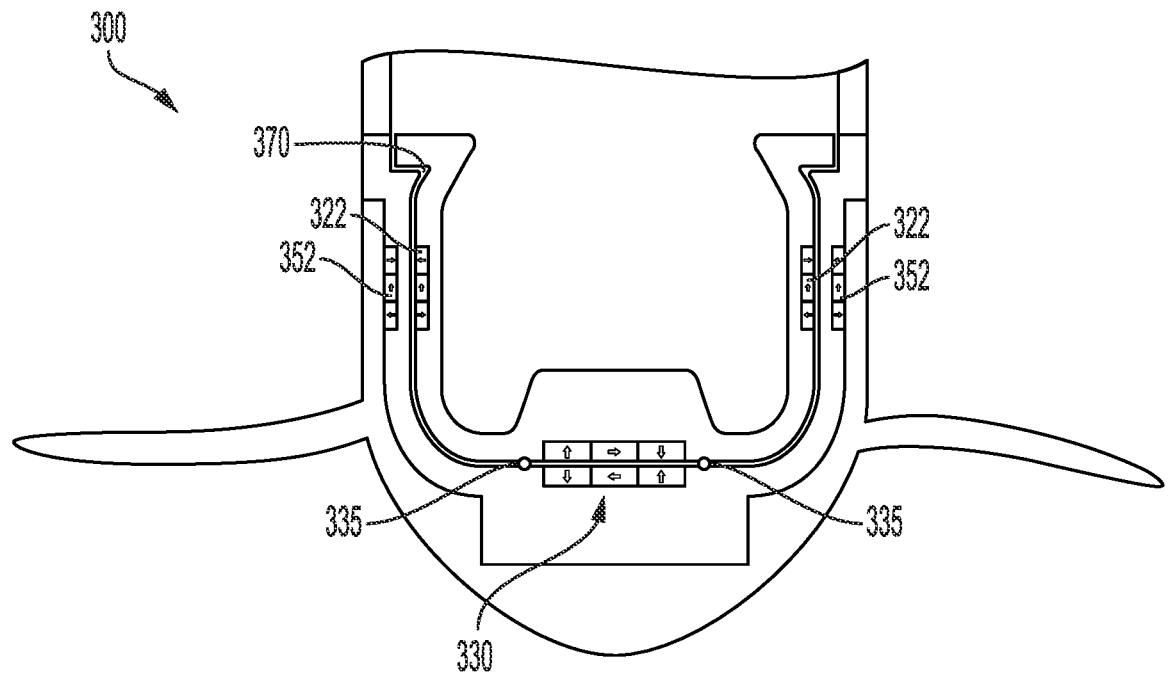
FIG. 28 is a schematic, enlarged, partial, cross-sectional view of the hydroelectric energy system of FIG. 26 illustrating a second O-ring configuration in accordance with another embodiment of the present disclosure.
Figure 29:
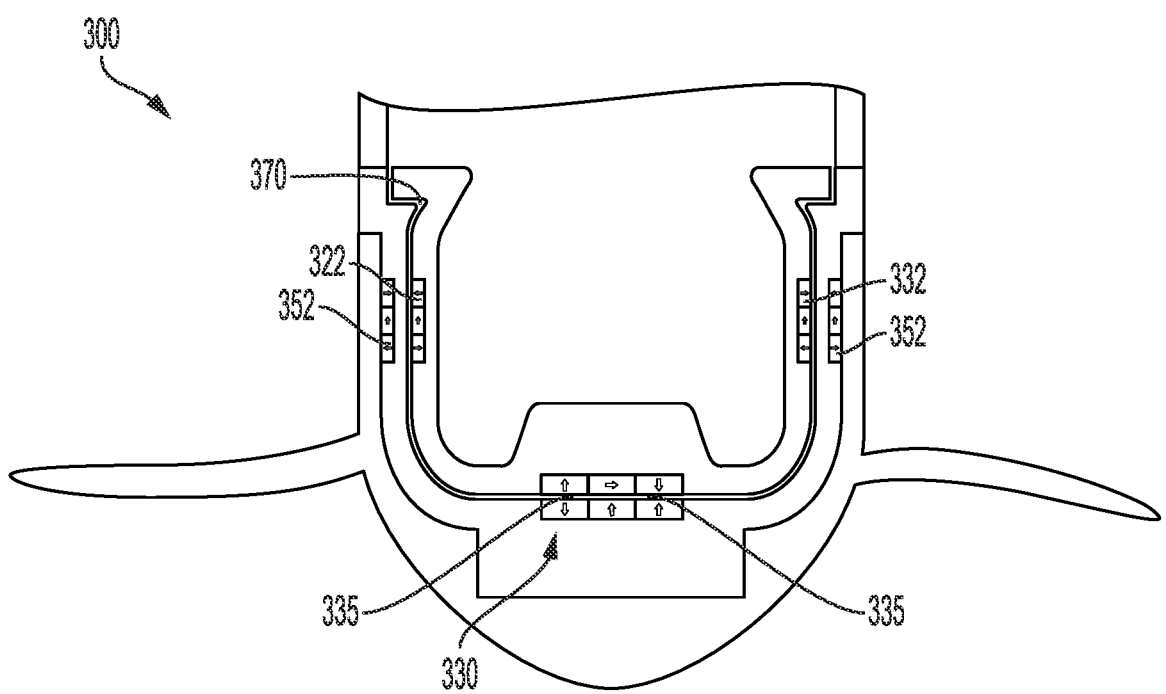
FIG. 29 is a schematic, enlarged, partial, cross-sectional view of the hydroelectric energy system of FIG. 26 illustrating a third O-ring configuration in accordance with yet another embodiment of the present disclosure.
Figure 30:
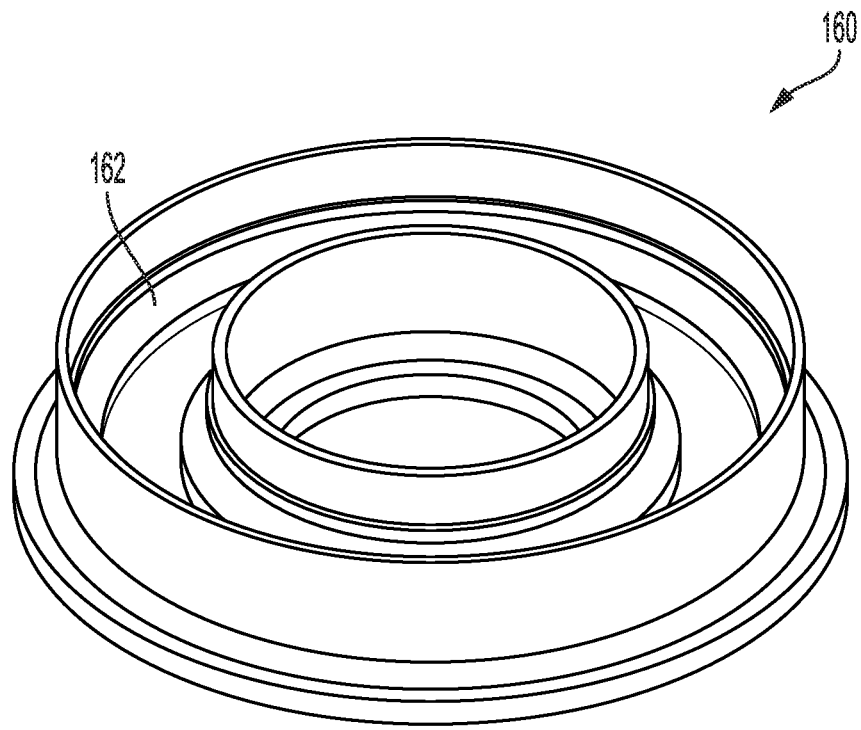
FIG. 30 is a perspective view of a rigid support structure in accordance with an embodiment of the present disclosure.
Figure 31:
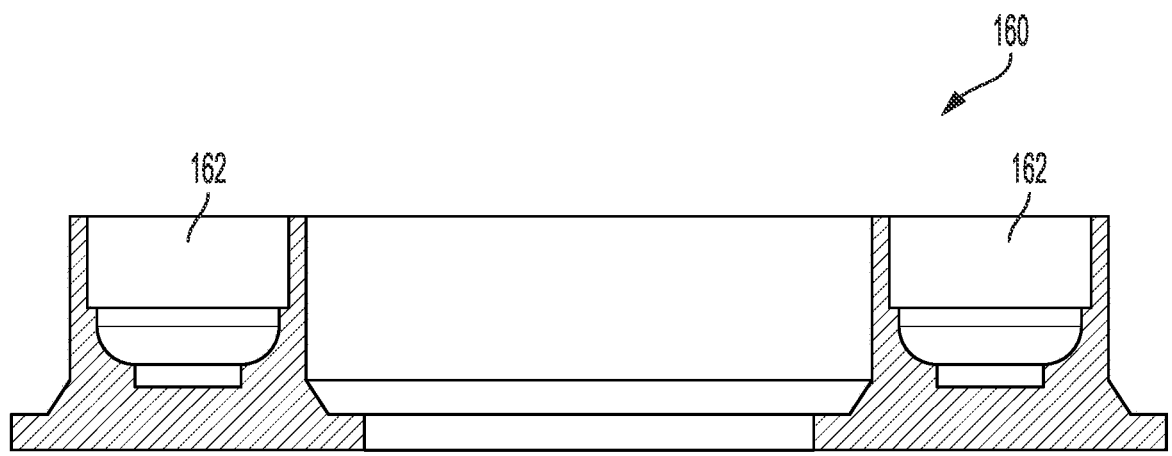
FIG. 31 is a cross-sectional view of the rigid support structure of FIG. 30.

In various additional embodiments, as illustrated in FIGS. 27-29, O-rings 335 may be placed at various locations within the gap 370 to prevent water from interfering with the magnetic bearing mechanism 330 (e.g., entering the portion of the gap 370 housing the magnetic bearing mechanism 330). Such an arrangement, which utilizes O-rings 335, may be beneficial in applications in which the turbine 300 is deployed in iron rich environments, to prevent iron filings in the fluid flow from interfering with the magnetic bearing mechanism. In such applications, the turbines may also employ filtration mechanisms, as discussed above, and as disclosed in International Patent Application entitled, "Filtration Systems and Methods for Hydroelectric Turbines," filed concurrently herewith.

Those of ordinary skill in the art would understand that the turbines 100, 200, and 300 are exemplary only and that various turbine designs, geometries, and configurations, utilizing various rotating ring and stationary ring foundation designs, which are separated by various geometries of bearing gaps, may be employed without departing from the scope of the present disclosure.

With reference now to FIGS. 30-39, an exemplary method of manufacturing a turbine in accordance with the present disclosure is discussed with reference to the turbine 100. As discussed above, the present disclosure contemplates utilizing additive manufacturing (AM) methods to print each of the stationary ring structure 102 and the rotating ring structure 104, thereby simplifying the turbine 100 by incorporating parts that would normally be fastened to the rings 102 and 104 into the rings themselves during the printing process. Thus, each of the multiple components, which was previously required to be separately attached to one of the rings, as well as the fasteners used to attach the separate components, represents a potential point of failure in the turbine that will be eliminated in the turbines manufactured using AM techniques according to the present disclosure. Thus, by attempting to consolidate multiple component parts into a single part (into the rotating ring structure and the stationary ring structure), less total material will be needed by virtue of the ability to make parts thinner or otherwise with less material, and there will be fewer potential points of failure.

Embodiments of the present disclosure also contemplate using a material that is structurally strong, such as, for example, a carbon fiber-reinforced thermoplastic, to print each of the stationary ring structure 102 and the rotating ring structure 104. While hydroelectric turbines have previously been manufactured using composite materials to manufacture high-strength, low-weight components, additive manufacturing (AM) affords an opportunity to further maximize the ratio between the swept area, Ar, of the blade support ring and the equivalent mass of the turbine, Meq. Each turbine, for example, can be designed to represent a holistic solution tailored to accommodate specific needs while maximizing power generation and return on investment. The designs can be saved in a design file and later printed on site during assembly of the turbine. Furthermore, each of the stationary ring structure 102 and the rotating ring structure 104 can be readily scaled (via the stored design file) to accommodate various applications and sizes of turbines. In this manner, AM allows for turbine geometries that were not previously possible using conventional manufacturing approaches. Accordingly, with AM printing programmed, at the push of a button, a wide range of unique turbines can be printed to collect current energy from a wide range of natural currents wherever they are found on the Earth's surface.

For example, as discussed above, the printed hydroelectric turbine 100 may have a simple stacked configuration, in which the stationary ring structure 102 is printed first, and the rotating ring structure 104 is printed over the stationary ring structure 102. In accordance with one embodiment, in an initial step, a foundation for the stationary ring structure (i.e., the stationary ring foundation 112) is printed. During this printing process, the U-shaped body (e.g., having a U-shaped cross-section 130) of the stationary ring foundation 112 is formed, for example, with a lip 139 (see FIGS. 5, 6, and 32) and with the slots 132 for later receipt of the first plurality of electricity-generating elements 122 and the first bearing material 126. The stationary ring foundation 112 may be printed using various materials added during the printing process, as those of ordinary skill in the art would be familiar with. Various embodiments contemplate, for example, using a material that is structurally strong while also being resistant to corrosion and biofouling, such as, for example, a carbon fiber-reinforced thermoplastic, to print the stationing ring foundation.

During a pause in the printing process, the first electricity-generating elements (e.g., laminated coils 122) are inserted and secured within the slots 132. The coils 122 may be mounted within the slots 132 using various techniques and methods, including, for example via mounting pegs and via encapsulation within interlocking blocks (e.g., LEGO®-type blocks) 121, as described above. In various embodiments, at this stage, the first bearing material 126 (e.g., the bearing plates 126) may also be mounted within the slots 32 in the same manner.

Figure 32:
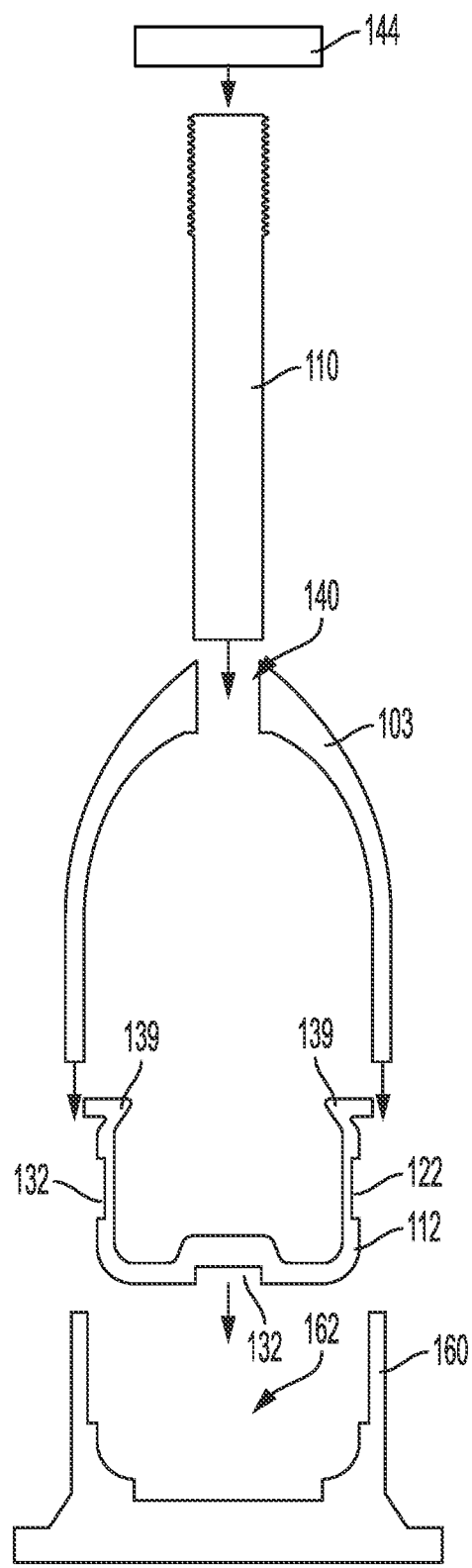
FIGS. 32-39 are schematic, partial, cross-sectional views illustrating a method of manufacturing a hydroelectric energy system in accordance with an embodiment of the present disclosure.

As shown in FIG. 32, the printed stationary ring foundation 112 is then placed within a rigid support structure 160. The rigid support structure 160 includes an internal cavity 162 (see FIGS. 30 and 31), which is shaped and configured to receive the stationary ring foundation 112. A mold, such as, for example, the stationary ring mold 103 is then positioned over an inner circumferential surface 138 of the stationary ring foundation 112 (e.g., over the opening 117 of the stationary ring foundation 112) to form an internal cavity 177 (see FIGS. 33-36) between the stationary ring mold 103 and the stationary ring foundation 112. The mold 103 can, for example, be pre-printed, in another step of the printing process, and lowered onto the support structure 160 holding the stationary ring foundation 112, as shown in FIG. 32. In various embodiments, the stationary ring mold 103 may include one or more openings 140, which are located opposite to the stationary ring foundation 112 when the stationary ring mold 103 is positioned over the stationary ring foundation 112. In such embodiments, a respective leg 110 may then be inserted through each of the one or more openings 140 into the internal cavity 177, and a foot 144 may be mounted onto each of the respective legs 110.

Figure 33:
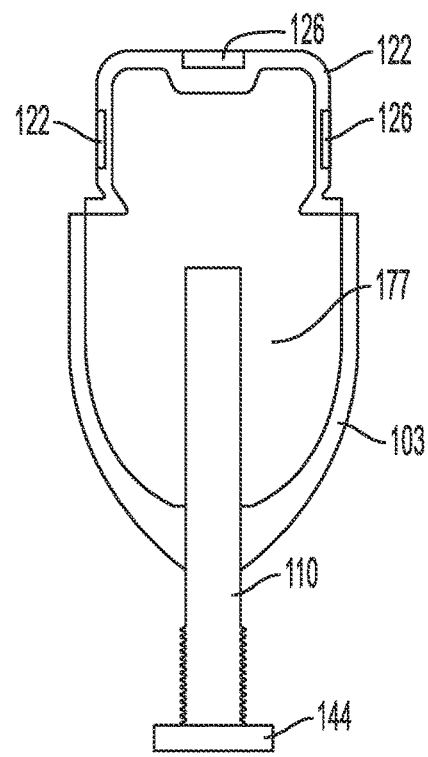
Figure 35:
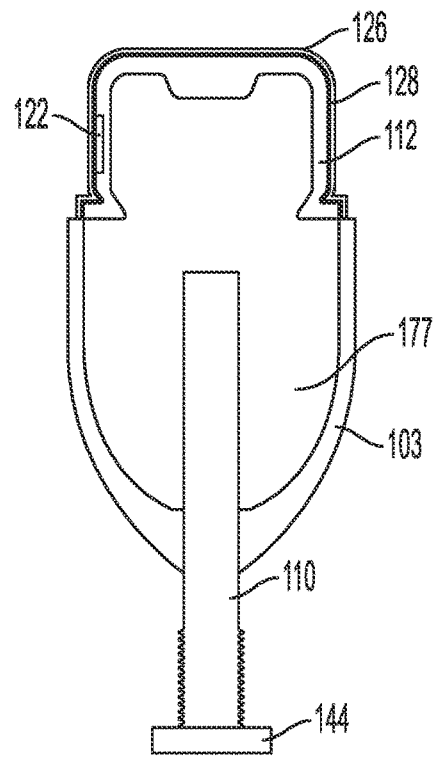

The partial turbine assembly (i.e., including the stationary ring foundation 112 and the stationary ring mold 103) may then be removed from the rigid support structure 160 and flipped over onto the legs 110, such that the assembly is now supported by the legs 110 and the feet 144. In this advantageous position, as illustrated in FIG. 33, in various embodiments, the first bearing material 126 may now be affixed to the outer circumferential surface 118 of the stationary ring foundation 112. In one embodiment, the first bearing material 126, in the form of bearing plates 126, is mounted within the remaining slots 132 in the stationary ring foundation 112. For example, via encapsulation within interlocking blocks (e.g., LEGO®-type blocks) 121, as described above. In another embodiment, instead of installing the bearing plates 126 within the slots 132, the assembly can be returned to the printer and the first bearing material 126 can be printed directly onto the outer circumferential surface 118 of the stationary ring foundation 112, as illustrated in FIG. 35. In such embodiments, a material having the characteristics of a thermopolymer or thermoplastic bearing material, such as, for example, Vesconite, can be printed directly onto one or more portions of the outer circumferential surface 118, for example, within the slots 132, or as a veneer onto a flat surface (e.g., when slots are not printed), in various configurations as illustrated for example, in FIGS. 7A-7E. As shown in FIG. 35, the bearing material 126 can also be printed as a veneer over the entire outer circumferential surface 118 of the stationary ring foundation 112.

Figure 34:
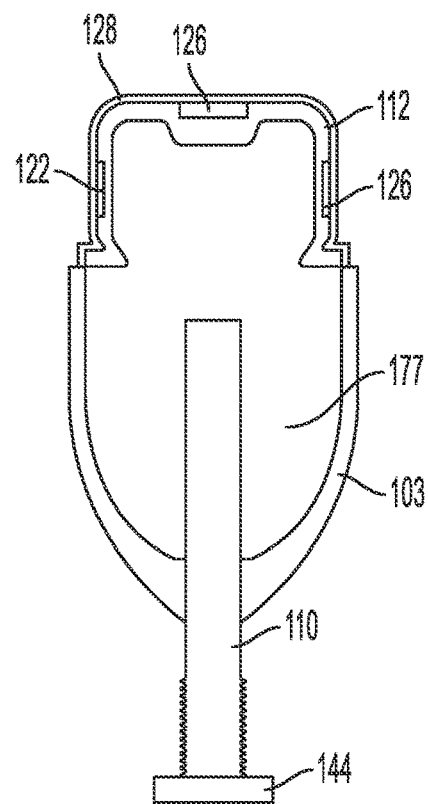

Once the first bearing material 126 is installed, in various embodiments, as illustrated in FIGS. 34 and 35, a thin layer of an abradable material 128 is then inserted over the bearing material 126. The abradable material 128 is configured, for example, to separate the stationary ring structure 102 from the rotating ring structure 104 during the printing process (e.g., to separate the bearing materials 126 and 156 respectively located on the stationary ring structure 102 and the rotating ring structure 104), and then wear away when the rotating ring structure 104 begins to rotate with relation to the stationary ring structure 102 (e.g., when the turbine 100 is installed within the fluid current F) to form the fluid-filled gap 170 between the structures 102 and 104. In this manner, the abradable material may be made from any material that will degrade due to the friction created between the structures 102 and 104 during the rotation. In one embodiment, for example, the abradable material 128 may include a thin sheet of paper that is inserted over the bearing material 126. In another embodiment, the abradable material may include a degradable material that is printed directly over the outer circumferential surface 118 of the stationary ring structure 112 and the first bearing material 126.

Figure 36:
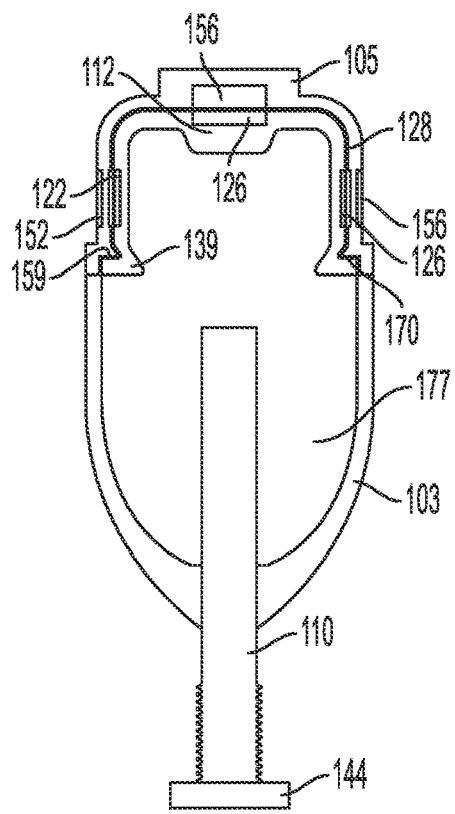

As illustrated in FIG. 36, a foundation for the rotating ring structure 104 (i.e., the rotating ring foundation 105) is then printed. During this portion of the printing process, the U-shaped body (e.g., having a U-shaped cross-section 150) of the rotating ring foundation 105 is printed over the outside circumferential surface 118 of the stationary ring foundation 112 (e.g., over the abradable material 128). For example, the rotating ring foundation 105 is printed with a corresponding lip 159 (see FIGS. 16, 17, and 36) that is configured to engage with the lip 139 of the stationary ring foundation 112, with the slots 154 for later receipt of the second plurality of electricity-generating elements 152 and the second bearing material 156, and optionally with slots 116 for later receipt of the blade support segments 106. In one embodiment, as shown in FIG. 36, the rotating ring foundation 105 is also configured to adjoin the stationary ring mold 103 to form a relatively smooth transition between the stationary ring structure 102 and the rotating ring structure 104 (i.e., to form a relatively smooth, continuous outer surface of the turbine 100). Similar to the stationary ring foundation 112, the rotating ring foundation 105 may also be printed using various different materials added during the printing process, as those of ordinary skill in the art would be familiar with. Various embodiments also contemplate using a material that is structurally strong while also being resistant to corrosion and biofouling, such as, for example, a carbon fiber-reinforced thermoplastic, to print the rotating ring foundation 105.

During another pause in the printing process, the second electricity-generating elements (e.g., magnets 152) and the second bearing material (e.g., stainless-steel plates 156) are inserted and secured within the slots 154. The magnets 152 and the stainless-steel plates 156 may be mounted within the slots 154 using various techniques and methods, including, for example being epoxied within the slots and via encapsulation within interlocking blocks (e.g., LEGO®-type blocks) 121 for insertion within the slots 154, as described above. In another embodiment, instead of installing the bearing plates 156 within the slots 154, the assembly can be returned to the printer and the second bearing material 156 can be printed directly onto one or more portions of the rotating ring foundation 105, for example, within the slots 154, or as a veneer onto a flat surface (e.g., when slots are not printed), in various configurations as illustrated for example, in FIGS. 18A-18E.

Figure 37:
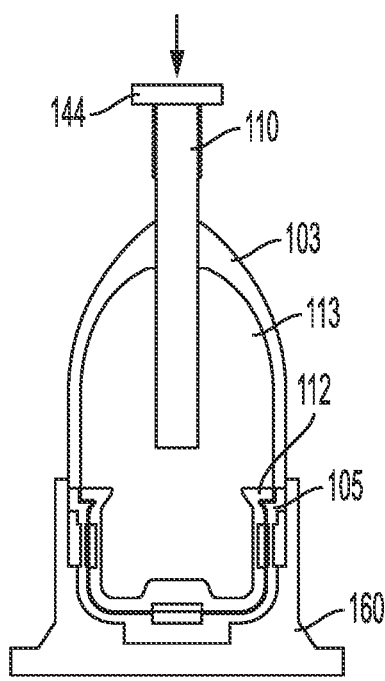

To form the stationary ring backing 113, the partial turbine assembly (i.e., the rotating ring foundation 105, the stationary ring foundation 112, and the stationary ring mold 103) may then be returned to the rigid support structure 160 (e.g., placed again within the cavity 162 of the rigid support structure 160), as shown in FIG. 37. The internal cavity 162 (see FIGS. 30 and 31) is, for example, also shaped and configured to receive the rotating ring foundation 105 (which now comprises the outer layer of the partial turbine structure). In this advantageous position, as illustrated in FIG. 37, the stationary ring mold 103 extends upward relative to and is supported by the support structure 160, such that the internal cavity 177 (e.g., between the stationary ring mold 103 and the stationary ring foundation 112) can be filled with a core material. The core material is then pumped and/or extruded into the internal cavity, where it may harden to form the backing 113 of the stationary ring structure 102. In one embodiment, for example, concrete is extruded into the cavity 177 to form the stationary ring backing 113.

Those of ordinary skill in the art would understand, however, that the stationary ring backing 113 may be formed using various methods and with various materials, including, but not limited to, by extruding concrete into the cavity 177 formed between the stationary ring mold 103 and the stationary ring foundation 112. Those of ordinary skill in the art would further understand that the stationary ring backing 113 may be formed at various points during the printing process. For example, additional embodiments of the present disclosure contemplate forming the stationary ring backing 113 (e.g., filling the cavity 177 with the core material) earlier in the process, prior to installing the legs 110 within the cavity 177.

Figure 38:
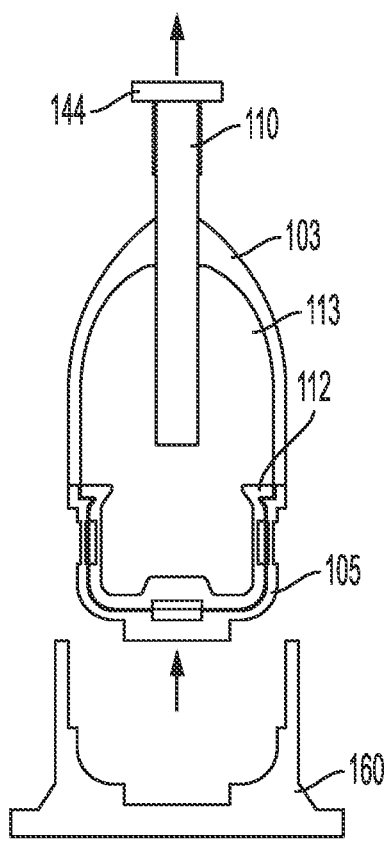
Figure 39:
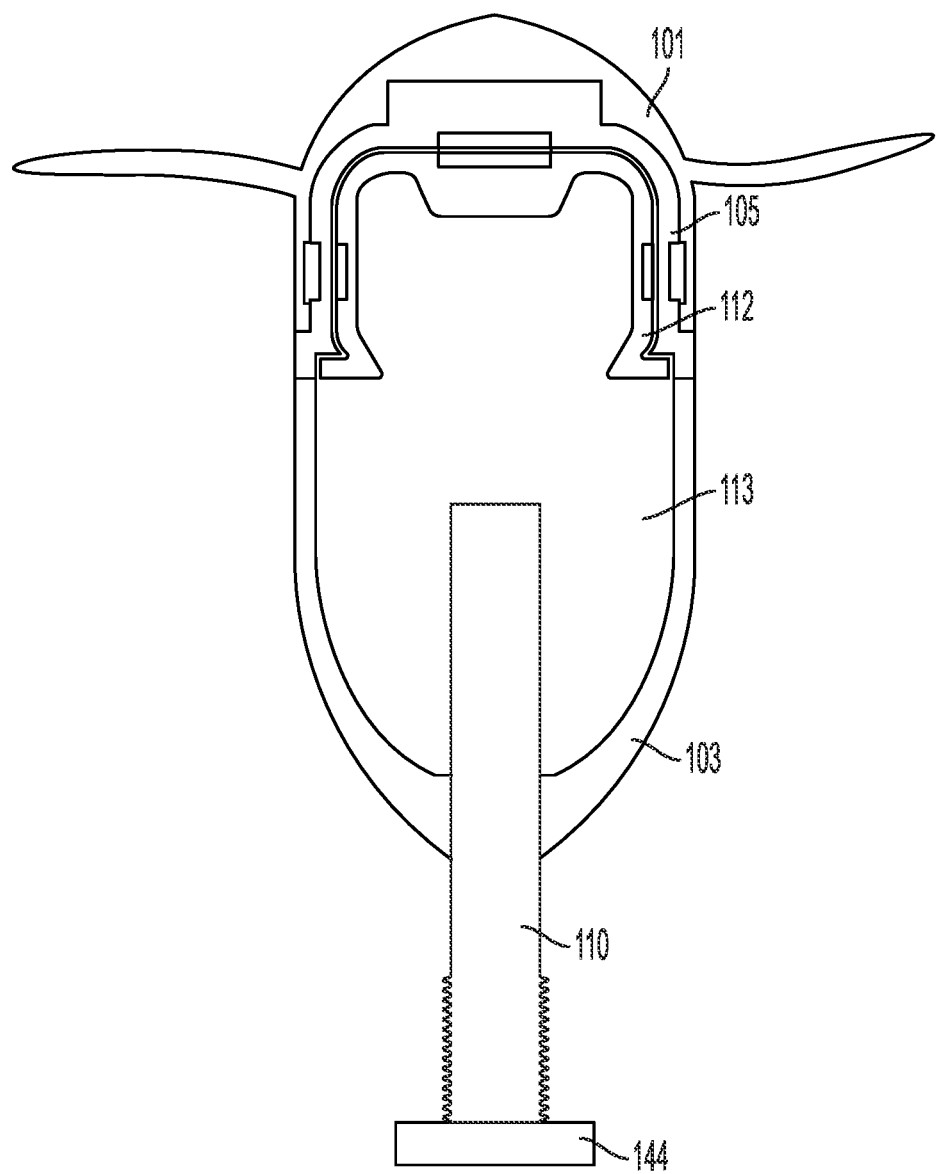

As illustrated in FIGS. 38 and 39, the partial turbine assembly is then removed again from the rigid support structure 160 and flipped back over onto the legs 110 (i.e., to be supported again by the legs 110 and the feet 144) to expose the rotating ring foundation 105. The blade support ring 101 is then printed and affixed to the rotating ring foundation 105. As discussed above, in one embodiment, the blade support ring 101 is printed as a plurality of individual blade support segments 106, wherein each blade support segment 106 includes a respective blade 108 for the turbine 100. The blade support segments 106 are then affixed within the blade slots 116 of the rotating ring foundation 105, such that each blade slot receives a respective blade support segment 106. The blade support segments 106 can, for example, be epoxied and/or bolted into the slots 116 via bolts 111 (see FIG. 4). In another embodiment, the blade support ring 101 can be printed as a single, monolithic structure directly onto the rotating ring foundation 105.

Figure 44:
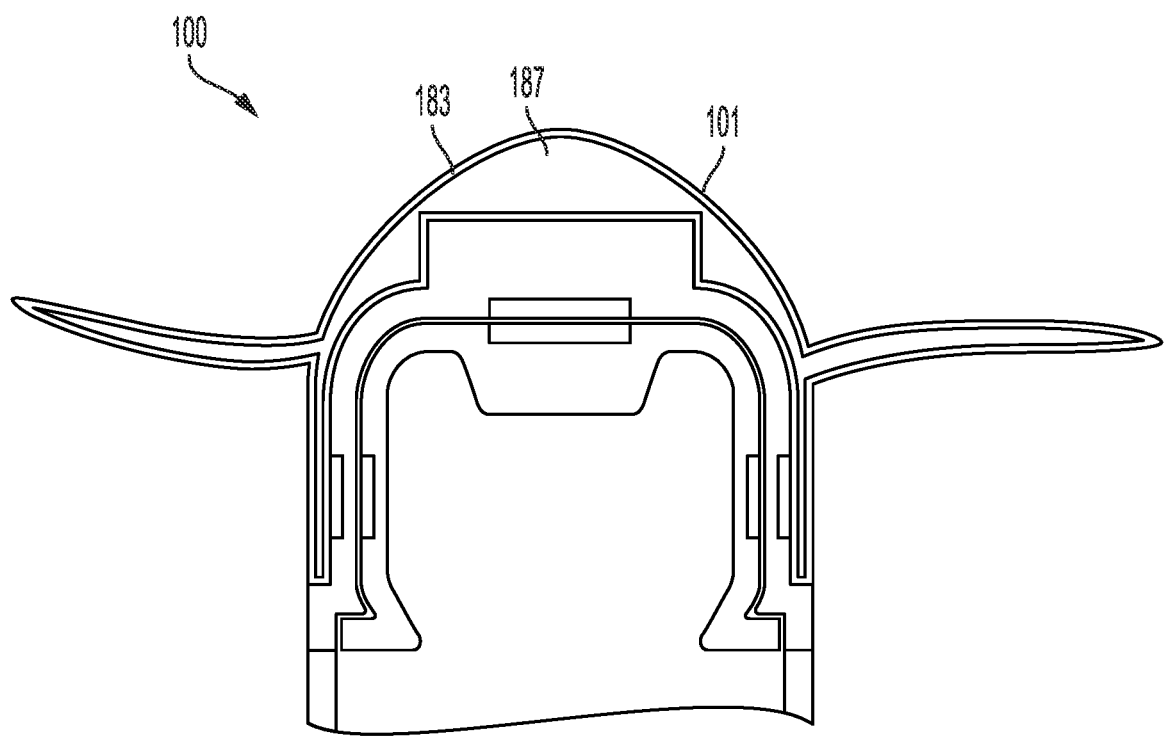
FIG. 44 is a schematic, partial, cross-sectional view of a hydroelectric energy system incorporating a blade support ring with an internal cavity in accordance with another embodiment of the present disclosure.

The blade support ring 101 may be printed from the same material as the rotating ring foundation 105, using various different materials added during the printing process, as those of ordinary skill in the art would be familiar with. Various embodiments again contemplate using a material that is structurally strong while also being resistant to corrosion and biofouling, such as, for example, a carbon fiber-reinforced thermoplastic, to print the blade support ring 101. As shown in FIG. 44, various additional embodiments further contemplate printing only an outer shell (e.g., skin) 183 of the blade support ring 101, for example, only an outer skin 183 of each individual blade support segment 106, such that the blade support ring 101 (e.g., each individual segment 106) has a hollow internal cavity 187. The hollow internal cavity 187 is then filled with a core material that may harden, such as, for example, a pourable/extrudable concrete material, similar to the formation of the stationary ring backing 113 discussed above.

Those of ordinary skill in the art will understand that the manufacturing methods and printing processes described above, with reference to the turbine 100, are exemplary only and that the contemplated methods may include various additional steps, such that the printed components (i.e., blade support ring 101, rotating ring foundation 105, stationary ring foundation 112, and stationary ring mold 103) have various additional features, and that the steps may be carried out in a different order.

In another embodiment for example, as illustrated in FIG. 40, the rotating ring structure 104 may also be configured to receive a filtration mechanism 180 that is placed upstream of the gap 170, such that the fluid flow F is first directed through the filtration mechanism 180 prior to entering the gap 170, as disclosed in International Patent Application entitled, "Filtration Systems and Methods for Hydroelectric Turbines," filed concurrently herewith, the entire contents of which are incorporated by reference herein. In such embodiments, the blade support ring 101 and the rotating ring foundation 105 may be printed with one or more openings 171, which are each connected to the gap 170 via a respective channel 172. Each opening 171 is configured to receive a respective filtration mechanism (e.g., filter) 180, for example, each opening 171 may removably receive a respective filtration mechanism 180 such that the filtration mechanisms 180 may be both easily installed and removed for maintenance and replacement purposes. In various embodiments, for example, during the printing process, the openings 171 can be formed in each blade support segment 106 (and corresponding blade slot 116), or otherwise formed in the portions of the blade support ring 101 comprising the blades 108, such that the opening 171 is located between the blade portions 107 and 109.

Figure 45:
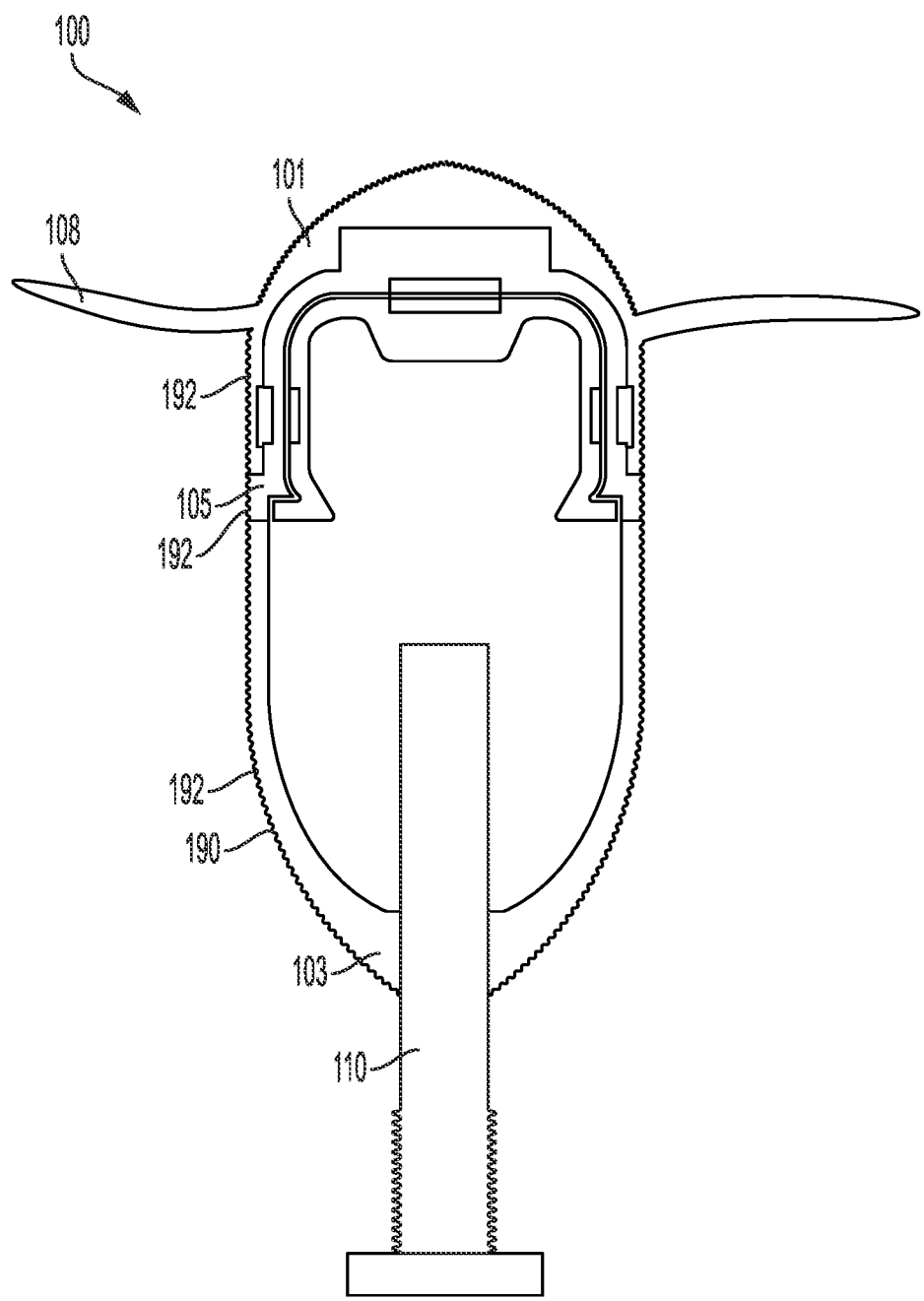
FIG. 45 is a schematic, partial, cross-sectional view of a hydroelectric energy system incorporating dimples in accordance with yet another embodiment of the present disclosure.

In yet another embodiment, as illustrated in FIG. 45, various portions of the rotating ring structure 104 and the stationary ring structure 102 may be printed with a surface texturing, such that one or more portions of an exterior surface 190 of the turbine 100 are textured. As shown in FIG. 45, in one embodiment, portions of the blade support ring 101, rotating ring foundation 105, and stationary ring mold 103 may be printed with dimples, such that the entire exterior surface 190 of the turbine 100, with the exception of the blades 108 and the legs 110, is dimpled. Those or ordinary skill in the art would understand that various types and configurations of texturing, as known in the art, can be applied to various surfaces of the turbine during the printing process.

Figure 41:
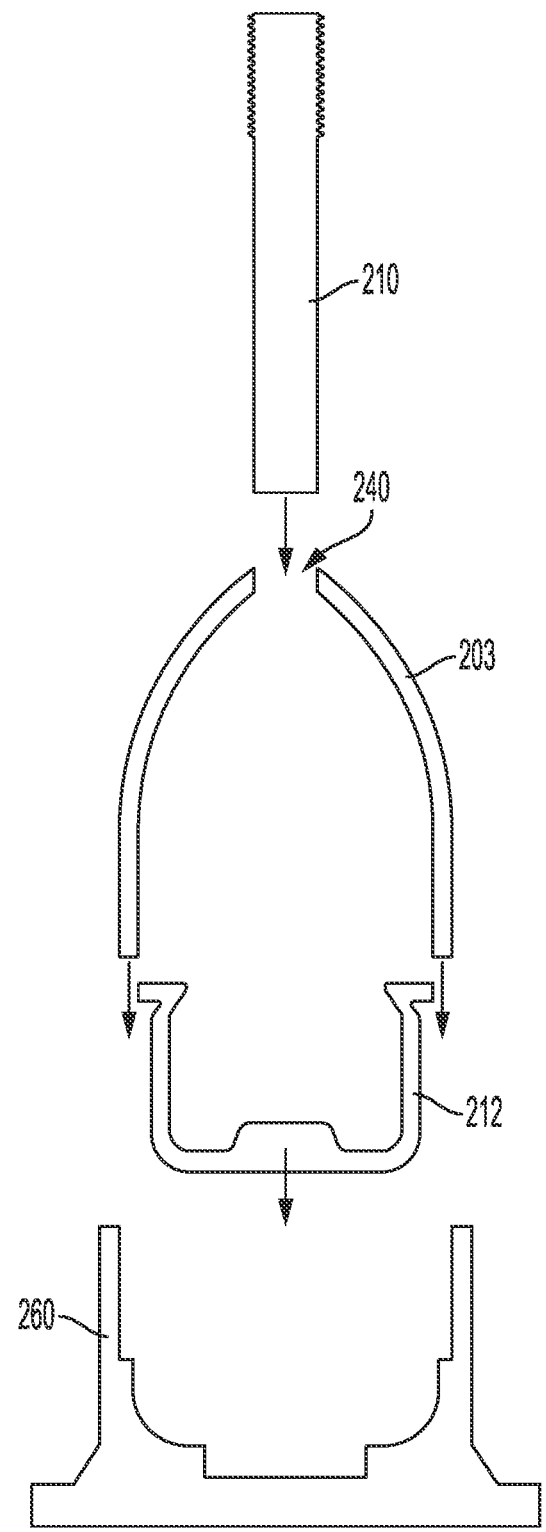
FIGS. 41-43 are schematic, partial, cross-sectional views illustrating a method of manufacturing a hydroelectric energy system in accordance with another embodiment of the present disclosure.
Figure 42:
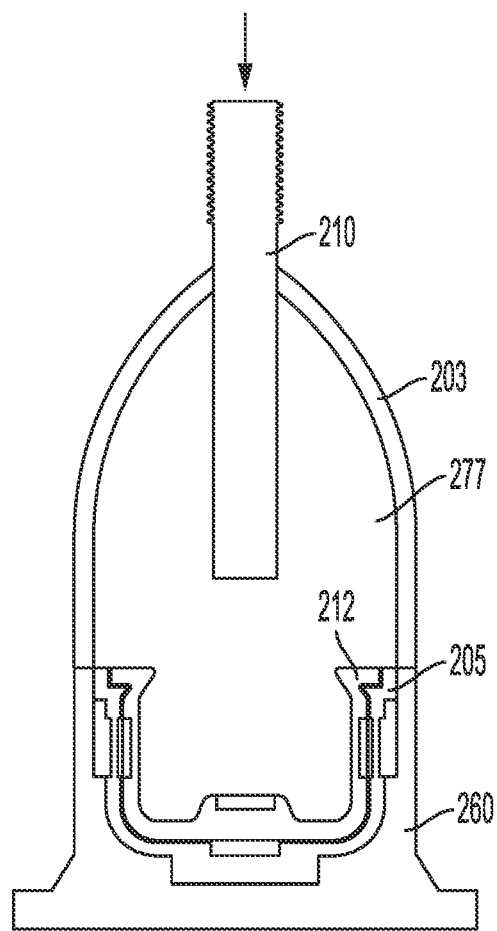
Figure 43:
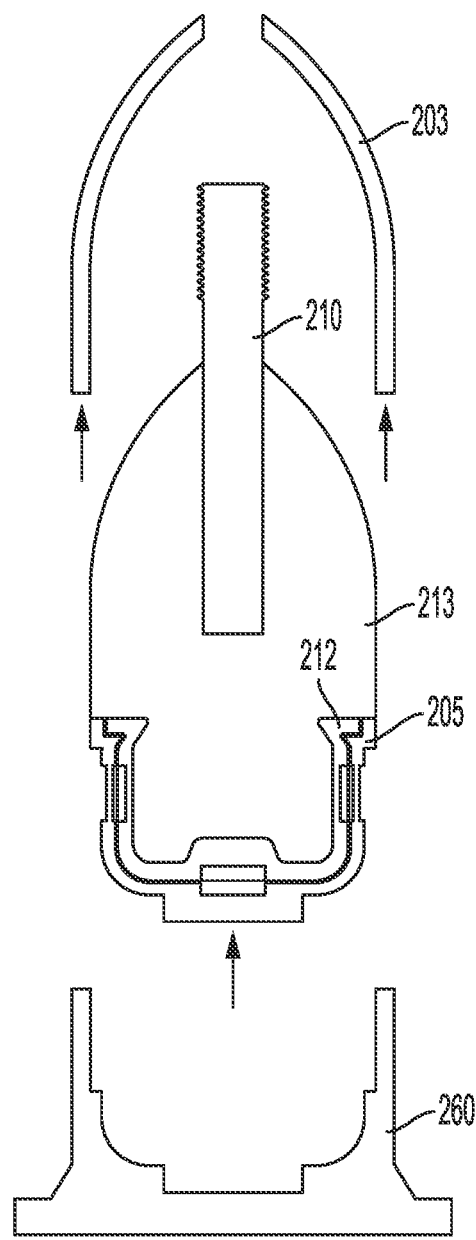

A modified method of manufacturing a turbine 200 (see FIGS. 22-25) is also illustrated in FIGS. 41-43. As discussed above, the turbine 200 only employs a stationary ring backing 213 and does not include a stationary ring mold 203 as an outer shell to the backing 213. Thus, the stationary ring backing 213 is manufactured to directly adjoin the rotating ring structure 204 to form a relatively smooth, continuous outer surface of the turbine 200, and the stationary ring mold 203 is removed during the printing process. As shown in FIG. 41, similar to the above discussed method, a preprinted stationary ring foundation 212 is placed within a support structure 260, a stationary ring mold 203 is positioned over the stationary ring foundation 212 (e.g., to form a cavity 277 between the stationing ring foundation 212 and the mold 203), and one or more legs 210 are inserted into respective holes 240 in the stationary ring mold 203. Although not shown, also as discussed above, the assembly is then flipped over onto the legs 210 to affix a bearing material, insert an abradable material, and print a rotating ring foundation 205. As shown in FIG. 42, the assembly may then be returned to the support structure 260, where the cavity 277 is filled with a core material to form the stationary ring backing 213, as discussed above. Once the stationary ring backing 213 is formed (i.e., the core material hardens to take the shape of the mold 203), as shown in FIG. 43, the mold 203 is removed from the backing 213 and the assembly is again removed from the support structure 260 for printing of the blade support ring (not shown). It may be advantageous to use the above modified method, for example, for larger turbine applications, in which it may be beneficial to re-use the stationary ring mold 203 to manufacture multiple turbines, instead of printing a new stationary ring mold for each turbine.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be included in the second embodiment.

It is noted that, as used herein, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure. For example, spatially relative terms— such as "upstream," downstream," "beneath," "below," "lower," "above," "upper," "forward," "front," "behind," and the like—may be used to describe one element's or feature's relationship to another element or feature as illustrated in the orientation of the figures. These spatially relative terms are intended to encompass different positions and orientations of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the systems and methods of the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure.

It is to be understood that the particular examples and embodiments set forth herein are non-limiting, and modifications to structure, dimensions, materials, and methodologies may be made without departing from the scope of the present disclosure. Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents.

What is claimed is:

1. A hydroelectric energy system, the system comprising:
a stationary ring structure comprising a stationary ring foundation and a stationary ring backing disposed at least partially within an opening defined by the stationary ring foundation, the stationary ring foundation having a first plurality of electricity-generating elements;
a rotating ring structure comprising a rotating ring foundation and a blade support ring disposed radially outward of an outer circumferential surface of the rotating ring foundation, the rotating ring foundation having a second plurality of electricity-generating elements, wherein the rotating ring foundation is disposed radially outward of an outer circumferential surface of the stationary ring foundation and is configured to rotate around the stationary ring foundation about an axis of rotation; and
at least one bearing mechanism configured to support the rotating ring structure relative to the stationary ring structure during rotation of the rotating ring foundation around the stationary ring foundation,
wherein, in a submerged position within a fluid current causing during the rotation of the rotating ring foundation around the stationary ring foundation, the stationary ring backing is configured to be in compression and to support the stationary ring foundation, the rotating ring foundation, and the blade support ring in a stacked configuration.

2. The hydroelectric energy system of claim 1, wherein the blade support ring comprises a plurality of blades, each of the plurality of blades comprising a first blade portion extending radially inward with respect to the blade support ring and a second blade portion extending radially outward with respect to the blade support ring, the plurality of blades being configured to interact with the fluid current to cause rotation of the rotating ring foundation.

3. The hydroelectric energy system of claim 2, wherein the rotating ring foundation comprises a plurality of slots and the blade support ring comprises a plurality of blade support segments, each blade support segment including one of the plurality of blades, and each slot of the rotating ring foundation being configured to receive a respective blade support segment.

4. The hydroelectric energy system of claim 2, wherein the rotating ring foundation and the blade support ring are a single, monolithic structure.

5. The hydroelectric energy system of claim 1, wherein the first plurality of electricity-generating elements comprises a plurality of laminated coils, each of the laminated coils being encapsulated in a respective block, each block being interlocked within a respective slot in the stationary ring foundation.

6. The hydroelectric energy system of claim 1, wherein the second plurality of electricity-generating elements comprises a plurality of laminated magnets, each of the laminated magnets being encapsulated in a respective block, each block being interlocked within a respective slot in the rotating ring foundation.

7. A method of manufacturing a stationary ring structure for a hydroelectric energy system, the method comprising:
forming a foundation for the stationary ring structure, the foundation having a circular shape with a U-shaped cross-section, wherein the U-shaped cross-section comprises a base and first and second side walls extending substantially perpendicular to the base, the foundation having at least one slot configured to receive a plurality of electricity-generating elements;
affixing the plurality of electricity-generating elements within the at least one slot of the foundation;
overlaying the foundation with a mold, such that the mold adjoins the first and second side walls and the foundation and mold together define a sealed internal cavity; and
filling the internal cavity with a core material, the core material being configured to harden to form a backing of the stationary ring structure, the backing being configured to be in compression during operation of the hydroelectric energy system.

8. The method of claim 7, further comprising affixing a bearing material to an outer circumferential surface of the foundation.

9. The method of claim 8, wherein the mold has one or more openings, the one or more openings being positioned opposite the foundation when the mold overlays the foundation, the method further comprising inserting a respective leg into each of the one or more openings.

10. The method of claim 7, wherein filling the internal cavity with the core material comprises extruding concrete into the internal cavity.

11. The method of claim 7, wherein forming the foundation for the stationary ring structure comprises forming the foundation for the stationary ring structure via additive manufacturing.

12. A method of manufacturing a hydroelectric energy system comprising a stationary ring structure and a rotating ring structure, the method comprising:
positioning a stationary ring mold over an inner circumferential surface of a stationary ring foundation to form an internal cavity between the stationary ring mold and the stationary ring foundation;
affixing a bearing material to an outer circumferential surface of the stationary ring foundation;
inserting a thin layer of an abradable material over the bearing material, wherein, during operation of the hydroelectric energy system, the abradable material is configured to wear away to form a bearing gap between the stationary ring structure and the rotating ring structure;
filling the internal cavity formed between the stationary ring mold and the stationary ring foundation with a core material, the core material being configured to harden to form a backing of the stationary ring structure; and
attaching a blade support ring to a rotating ring foundation to form the rotating ring structure, the blade support ring comprising one or more blades, each blade extending both radially inwardly of the blade support ring and radially outwardly of the blade support ring.

13. The method of claim 12, wherein positioning the stationary ring mold over the stationary ring foundation comprises placing the stationary ring foundation within a rigid support structure and lowering the stationing ring mold onto the rigid support structure.

14. The method of claim 12, wherein filling the internal cavity with the core material comprises extruding concrete into the internal cavity.

15. The method of claim 12, wherein affixing the bearing material to the outer circumferential surface of the stationary ring foundation comprises printing a veneer of thermoplastic bearing material over the outer circumferential surface of the stationary ring foundation.

16. The method of claim 12, wherein affixing the bearing material to the outer circumferential surface of the stationary ring foundation comprises installing one or more bearing plates along the outer circumferential surface of the stationary ring foundation.

17. The method of claim 12, wherein affixing the bearing material to the outer circumferential surface of the stationary ring foundation comprises installing one or more magnetic bearings along the outer circumferential surface of the stationary ring foundation.

18. The method of claim 12, wherein inserting the thin layer of the abradable material over the bearing material comprises printing the thin layer of abradable material over the bearing material.

19. The method of claim 12, wherein attaching the blade support ring to the rotating ring foundation comprises attaching the blade support ring as a single, monolithic structure directly onto the rotating ring foundation.

20. The method of claim 12, wherein attaching the blade support ring to the rotating ring foundation comprises attaching a plurality of blade support segments to the rotating ring foundation, each blade support segment comprising a respective blade.

21. The method of claim 20, wherein the rotating ring foundation includes a plurality of blade slots, each blade slot being configured to receive a respective blade support segment such that the blades of the blade support segment extend both radially inwardly of and radially outwardly of the rotating ring foundation.

22. The method of claim 21, further comprising affixing a respective blade support segment into each of the plurality of blade slots.

23. The method of claim 12, further comprising forming a foundation for the stationary ring structure, the stationary ring foundation having at least one slot within an outer circumferential surface of the stationary ring foundation, the at least one slot being configured to receive a first plurality of electricity-generating elements.

24. The method of claim 23, further comprising forming a foundation for the rotating ring structure over the abradable material, the rotating ring foundation having at least one slot configured to receive a second plurality of electricity-generating elements.

25. The method of claim 24, further comprising, prior to attaching the blade support ring to the rotating ring foundation, forming the blade support ring.

26. The method of claim 25, wherein forming the blade support ring comprises forming an outer skin of the blade support ring, the outer skin having a hollow internal cavity, and filling the internal cavity with a core material.

27. The method of claim 25, wherein forming the foundation for the stationary ring structure, the foundation for the rotating ring structure, and the blade support ring comprises forming one or more of the foundation for the rotating ring structure, the foundation for the rotating ring structure, and the blade support ring by additive manufacturing.

* * * * *

UNITED STATES PATENT AND TRADEMARK OFFICE
CERTIFICATE OF CORRECTION

PATENT NO. : 12,341,408 B2  
APPLICATION NO. : 18/687380  
DATED : June 24, 2025  
INVENTOR(S) : Daniel E. Power, III Page 1 of 1

It is certified that error appears in the above-identified patent and that said Letters Patent is hereby corrected as shown below:

In the Claims

In Column 18, Claim 1, Line 59, delete "during the".

Signed and Sealed this
Sixteenth Day of September, 2025

Coke Morgan Stewart
*Acting Director of the United States Patent and Trademark Office*